United States Patent [19]

Horie

[11] Patent Number: 5,546,564
[45] Date of Patent: Aug. 13, 1996

[54] COST ESTIMATING SYSTEM

[76] Inventor: Kazuhiko Horie, 771-15, Yabe-cho, Totsuka-ku, Yokohama-shi Kanagawa, Japan

[21] Appl. No.: 194,154

[22] Filed: Feb. 9, 1994

(Under 37 CFR 1.47)

[30] Foreign Application Priority Data

Feb. 9, 1993 [JP] Japan ................................ 5-020867
May 14, 1993 [JP] Japan ................................ 5-113094

[51] Int. Cl.$^6$ ................................................. G06F 17/18
[52] U.S. Cl. ...................... 395/500; 395/923; 364/188; 364/401 R; 364/464.01; 434/108
[58] Field of Search ................................. 395/500, 925, 395/923; 364/512, 464.01, 401, 408, 188, 468, 560, 562; 434/108

[56] References Cited

U.S. PATENT DOCUMENTS

| | | | |
|---|---|---|---|
| 4,700,318 | 10/1987 | Ockman | 395/131 |
| 5,189,606 | 2/1993 | Burns et al. | 364/401 |
| 5,249,120 | 9/1993 | Foley | 364/401 |

OTHER PUBLICATIONS

Christian et al., "Using Knowledge and Experiences for Planning the Cost-Time Profile of Construction Activities", University of New Brunswick, pp. 571-583.

Nacke et al., "A Building, Material, Labour, and Cost Information System" American Society of Agricultural Engineers, 1984, pp. 1-13.

Lusky et al., "Fundamental Concepts in Substation Design", IEEE 1993 pp. D2-D25.

Kitazawa et al., "Intelligence Document Generation System for Construction Planning", IEEE 1992, pp. 14-19.

"Cost Planning for Construction Project" by Foundational Juridical Person Construction Cost Research Group, Aug. 25, 1990, pp. 312-345. (English Translation enclosed herewith).

*Primary Examiner*—Kevin J. Teska
*Assistant Examiner*—Tan Nguyen

[57] ABSTRACT

A data estimating system for estimating a value of the highest probability which would correspond to a desired factor by statistically processing data having been determined from a plurality of factors. The factors are roughly divided into basic factors and environmental factors, and each of which is further classified into predetermined grades. The basic factor is a factor which would most generally affect on the determination of the data value. A weighed average is calculated in each class of the basic and environmental factors to be subject to statistical processing. The weighed average of the basic factor is then corrected by the use of a ratio of the weighed average of the environmental factor to the weighed average of all data as a correcting index, so as to provide a final estimation value. Thus using the environmental factor as a correcting index would enable to provide a result with high accuracy of estimation by simple calculation process.

14 Claims, 27 Drawing Sheets

SETTING OF COMMON DATA — ENVIRONMENTAL YARDSTICK KEY SETTING

[INDEX KEY]

| NO | MAJOR ITEMS | MINOR ITEMS 1 | MINOR ITEMS 2 | MINOR ITEMS 3 |
|---|---|---|---|---|
| 1 | SETTING OF COMMON DATA | ARBAN AREA | SUBURBS | OTHERS |
| 2 | CONSTRUCTION SITE | FLAT LAND | SLOPE LAND | GRADING |
| 3 | PLAN | SIMPLE | A LITTLE COMPLICATED | COMPLICATED |
| 4 | ELEVATION | SIMPLE | A LITTLE COMPLICATED | COMPLICATED |
| 5 | GRADE | NORMAL | GOOD | EXCELLENT |
| 6 | | | | |

[NUMERICAL VALUE KEY]

| NO | MAJOR ITEMS | |
|---|---|---|
| 1 | OPENING RATIO | % |
| 2 | EXTERIOR WALL RATIO | % |
| 3 | ATRIUM | m² |
| 4 | PILOTIS | m² |
| 5 | BALCONY | m² |
| 6 | | |

Buttons: SETTLED | FORMATTING | MENU | CONSTRUCTION TYPE CHANGE | CHANGE OF CONSTRUCTION PRICE AND COST RATIO | INDEX CHANGE | | INTERRUPTION

BUILDING USE:
BUILDING STRUCTURE:
COMPLETION YEAR:
CONSTRUCTION REGION:

| MINOR ITEMS | | TOTAL | TOTAL FLOOR AREA | PILING WORK | NUMBER OF BASEMENT FLOORS | SITE CONDITION | FLAT | EXTERIOR WALL RATIO |
|---|---|---|---|---|---|---|---|---|
| 0 ITEMS | | | | | | | | |
| 1 CONTRACT AMOUNT | 1000 YEN/m² | | | | | | | |
| 2 CONSTRUCTION COST | 1000 YEN/m² | | | | | | | |
| 3 NET CONSTRUCTION COST | 1000 YEN/m² | | | | | | | |
| 4 NET ARCHITECTURAL WORK COST | 1000 YEN/m² | | | | | | | |
| 5 NET BUILDING EQUIPMENT WORK COST | 1000 YEN/m² | | | | | | | |
| 6 EARTH WORK & PILING WORK COST | 1000 YEN/m² | | | | | | | |
| 7 STRUCTURAL WORK COST | 1000 YEN/m² | | | | | | | |
| 8 FINISHING WORK COST | 1000 YEN/m² | | | | | | | |
| 9 OVERHEADS | % | | | | | | | |
| 10 ADMINISTRATIVE EXPENSES | % | | | | | | | |
| 11 SITE OVERHEAD EXPENSES | % | | | | | | | |
| 12 BUILDING WORK COST RATIO TO TOTAL COST | | | | | | | | |
| 13 BUILDING EQUIPMENT COST TO TOTAL COST | | | | | | | | |

Fig. 15

| BUILDING USE & STRUCTURE: ( ) COMPLETION YEAR: |
| TOTAL FLOOR AREA: CONSTRUCTION REGION: |

| MINOR ITEMS | | TOTAL | TOTAL FLOOR AREA | BASEMENT FLOOR | CONSTRUC-TION SITE | CLIENT | TERMS OF CONTRACT | DESIGNER |
|---|---|---|---|---|---|---|---|---|
| 0 ITEMS | | | | | | | | |
| 1 CONTRACT AMOUNT | 1000 YEN/m² | | | | | | | |
| 2 CONSTRUCTION COST | 1000 YEN/m² | | | | | | | |
| 3 NET CONSTRUCTION COST | 1000 YEN/m² | | | | | | | |
| 4 NET ARCHITECTURAL WORK COST | 1000 YEN/m² | | | | | | | |
| 5 NET BUILDING EQUIPMENT WORK COST | 1000 YEN/m² | | | | | | | |
| 6 EARTH WORK & PILING WORK COST | 1000 YEN/m² | | | | | | | |
| 7 STRUCTURAL WORK COST | 1000 YEN/m² | | | | | | | |
| 8 FINISHING WORK COST | 1000 YEN/m² | | | | | | | |
| 9 OVERHEADS | % | | | | | | | |
| 10 ADMINISTRATIVE EXPENSES | % | | | | | | | |
| 11 SITE OVERHEAD EXPENSES | % | | | | | | | |
| 12 BUILDING WORK COST RATIO TO TOTAL COST | % | | | | | | | |
| 13 BUILDING EQUIPMENT COST RATIO TO TOTAL COST | % | | | | | | | |

THE MARK * INDICATES DATA OF JUST ONE ITEM.

Fig. 16

| BUILDING USE:<br>BUILDING STRUCTURE: | | | | COMPLETION YEAR:<br>CONSTRUCTION REGION: | | | |
|---|---|---|---|---|---|---|---|
| | AREA<br>YARDSTICK | | | ENVIRONMENTAL YARDSTOCK | | | |
| | | PILING WORK | NUMBER OF<br>BASEMENT FLOOR | SITE<br>CONDITION | PLAN | EXTERIOR<br>WALL RATIO % |
| NET ARCHITEC-<br>TURAL WORK<br>COST | | | | | | |
| NET BUILDING<br>EQUIPMENT<br>WORK COST | | | | | | |
| OVERHEADS | | | | | | |
| EXPECTED<br>CONSTRUCTION<br>COST 1000 YEN | | | | | | |

TOTAL FLOOR AREA $m^2$

Fig. 17

| BUILDING USE & STRUCTURE: ( ) COMPLETION YEAR: |||||||
|---|---|---|---|---|---|---|
| TOTAL FLOOR AREA: | | | | CONSTRUCTION REGION: | | |
| | AREA YARDSTICK | ENVIRONMENTAL YARDSTICK (DESIGN) || ENVIRONMENTAL YARDSTICK (ORDER AND ORDERED) |||
| | | BASEMENT FLOOR | CONSTRUC-TION SITE | CRIENT | TERMS OF CONTRACT | DESIGNER |
| NET ARCHITEC-TURAL WORK COST | | | | | | |
| NET BUILDING EQUIPMENT WORK COST | | | | | | |
| OVERHEADS | | | | | | |
| EXPECTED CONSTRUCTION COST 1000 YEN | | | | | | |

TEMPORARY WORK =     TOTAL FLOOR AREA     m²

Fig. 18

USE & STRUCTURE:
TOTAL FLOOR AREA:

( ) COMPLETION YEAR:
CONSTRUCTION REGION:

| ITEMS | | TOTAL | TOTAL FLOOR AREA | BASEMENT FLOOR | PLACE OF EXECUTION OF CONSTRUCTION | CLIENT | TERMS OF CONTRACT | DESIGNER |
|---|---|---|---|---|---|---|---|---|
| | | | | |1| | |2| | |2| |
| | | | | EXISTING | NORMAL URBAN DISTRICT | | BIDDING | DESIGN OFFICE |
| 0 ITEMS | | | | | | | | |
| 1 CONTRACT AMOUNT | 1000 YEN/m² | | | | | | | |
| 2 CONSTRUCTION COST | 1000 YEN/m² | | | | | | | |
| 3 NET CONSTRUCTION COST | 1000 YEN/m² | | | | | | | |
| 4 NET ARCHITECTURAL WORK COST | 1000 YEN/m² | | | | | | | |
| 5 NET BUILDING EQUIPMENT WORK COST | 1000 YEN/m² | | | | | | | |
| 6 EARTH WORK & PILING WORK COST | 1000 YEN/m² | | | | | | | |
| 7 STRUCTURAL WORK COST | 1000 YEN/m² | | | | | | | |
| 8 FINISHING WORK COST | 1000 YEN/m² | | | | | | | |
| 9 OVERHEADS | % | | | | | | | |
| 10 ADMINISTRATIVE EXPENSES ETC. | % | | | | | | | |
| 11 SITE OVERHEADS EXPENSES | % | | | | | | | |
| 12 CONSTRUCTION RATIO | | | | | | | | |
| 13 INSTALLATION RATIO | | | | | | | | |

THE MARK * INDICATES DATA OF JUST ONE ITEM.

Fig. 22

| | AREAL YARDSTICK | ENVIRONMENTAL YARDSTICK (DESIGN) 1 | | ENVIRONMENTAL YARDSTICK (ORDER AND ORDERED) 2 | | |
|---|---|---|---|---|---|---|
| | | BASEMENT FLOOR HAVING | CONSTRUC-TION SITE URBAN AREA | CLIENT | TERMS OF CONTRACT DESIGNER BIDDING | DESIGNER DESIGN OFFICE |
| NET BUILDING CONSTRUCTION COST | | | | | | |
| NET BUILDING EQUIPMENT WORK COST | | | | | | |
| OVERHEADS | | | | | | |
| EXPECTED CONSTRUC-TION COST 1000 YEN | | | | | | |

BUILDING USE & STRUCTURE:
TOTAL FLOOR AREA:
( ) COMPLETION YEAR:
CONSTRUCTION REGION:

TEMPORARY WORK =    TOTAL FLOOR AREA    m²

SELF-COMPANY STATISTICS Sim. 1
OUTPUT SCREEN OF ESTIMATION OF CONSTRUCTION COST

BUILDING USE: 14.1  OFFICE
BUILDING STRUCTURE: SRC

COMPLETION YEAR: 1990
CONSTRUCTION REGION: KANTO - 1

SEARCH [NEW]

| MINOR ITEMS | AREA YARDSTICK | ENVIRONMENTAL YARDSTICK | | | | | |
|---|---|---|---|---|---|---|---|
| | | PILING WORK | NUMBER OF BASEMENT FLOORS | SITE CONDITION | FLAT | EXTERIOR WALL RATIO | MULTIPLEX SEARCH |
| NET ARCHITECTURAL WORK COST | | | | | | | |
| CORRECTING VALUE | | | | | | | |
| CORRECT INPUT | | | | | | | |
| NET BUILDING EQUIPMENT WORK COST | | | | | | | |
| CORRECTING VALUE | | | | | | | |
| CORRECT INPUT | | | | | | | |
| OVERHEADS | | | | | | | |
| CORRECTING VALUE | | | | | | | |
| CORRECT INPUT | | | | | | | |
| EXECUTED CONSTRUCTION COST     1000 YEN | | | | | | | |

TOTAL FLOOR AREA [         ] $m^2$

DOCUMENTS FOR SUBMISSION: [1] [2] [3] [4] [5] [6] [7] [8]

TRANSFER AND ERASE

SUBMISSION AND TRANSFERENCE

[COMPUTATION] [PRINT]   [PLAN LIST]

PREVIOUS SCREEN

DT DISTRIBUTION  [  ]

REGION CHANGE [  ]   [YES] [DT LIST]

YEAR-CHANGE AREA

[YES] [INPUT AREA]

ERASE DATA [NO]  [INTERRUPTION]

Fig. 26

COST ESTIMATING SYSTEM

BACKGROUND OF THE INVENTION

1. Field of the Invention

This invention relates to a data estimating system, and more particularly to a system for providing desired data values by statistically computing a data group which is defined by a plurality of factors.

2. Description of a Related Art

On planning construction of buildings or estimating value of constructed buildings, hypothetical calculation of the construction cost based on a variety of data is indispensable. Particularly in the case of planning a building construction, this type of calculation is carried out at a preliminary stage where no drawings or specification are defined in detail yet. Since the outline of the business budget would largely depend on the result of the hypothetical calculation, it is quite important to make the calculation as accurate as possible.

The building construction cost is defined by a plurality of factors such as total floor area and construction site, which must therefore be precisely recognized at the time of estimation to be performed based on the previous data. Although such a method for obtaining a true value of certain event (the value of the highest probability) has been established in a variety of forms as probability or statistically methods, it could not necessarily be used in an easy and simple manner by anyone.

Further, most of these methods would provide a solution in such an indefinite form as tendency or range, so that they have been inconvenient or dissatisfied when definite values are required.

For calculating data value (construction cost) of the highest probability corresponding to a desired factor (for example, a property with $m^2$ of total floor area and a subbasement) on the basis of a variety of data defined by a plurality of factors such as rough construction cost of the building, it could be considered to enhance the accuracy of the calculation by eliminating the noise factors contained in the statistical data as much as possible. This method, however, would necessarily cause reduction of total data amount to be statistically processed. Pursuit of a value which could simultaneously meet a plurality of factors would therefore accompany significant lack of the total data amount.

SUMMARY OF THE INVENTION

It is therefore an object of this invention to provide a data processing apparatus which is capable of calculating a probability value corresponding to a desired factor of a plurality of data easily and without reducing the total data amount to be processed.

It is another object of this invention to provide a data processing apparatus capable of hypothetically calculating rough construction cost of a desired building from previous construction data easily with sufficient accuracy.

To achieve aforementioned objects, according to this invention, a data estimating system for estimating data value corresponding to a desired factor by statistically processing a plurality of data, the values of which are determined by a plurality of factors, said system comprising: memory means for storing said plurality of data; classifying means for classifying the data being stored in said memory means into each class by discriminating said plurality of factors as basic factors and environmental factors and classifying the basic factors and environmental factors with a predetermined grades; an average value calculating means for calculating an weighed average value of data in each class of the basic factor, an weighed average value of data in each class of the environmental factor, and an weighed average value of the total data; an input means for inputting a desired factor as a basic factor and an environmental factor; and a calculating means for estimating a data value corresponding to the desired factor based on a ratio of an weighed average value of a specific class corresponding to the input basic factor and an weighed average value of a specific class corresponding to the input environmental factor to the weighed average value of the total data.

According to this invention, a data estimating system for estimating construction cost of a building having a desired factor including a desired total floor area by statistically processing a plurality of construction cost data of the building which are determined by factors including the total floor area, said system comprising: memory means for storing the plurality of construction cost data of the building; classifying means for classifying building construction cost data stored in said memory means by classifying the total floor area and other factors by predetermined grades; an input means for inputting desired factors including desired total floor area; and calculating means for estimating the construction cost corresponding to the desired factors including the total floor area on the basis of the ratio of weighed average value of the construction cost per unit area of a specific class equivalent to the desired input total floor area, a weighed average value of construction cost per unit area of a specific class equivalent to factors other than the input total floor area, and the weighed average value of the construction cost per unit area of the aforementioned all data.

According to this invention, a data estimating system for estimating a construction cost of a building having desired factors including a desired total floor area by statistically processing construction cost data of a plurality of buildings determined from factors including the total floor area, said system comprising: memory means for storing building construction cost data of the plurality of buildings; classifying means for classifying the building construction cost data stored in said memory means by classifying the total floor area and other factors using predetermined grades; a first input means for inputting desired factors including a desired total floor area; second input means for inputting factors to be complex among the desired factors other than the desired total floor area; and calculating means for estimating a construction cost corresponding to desired factors including the desired total floor area on the basis of a ratio of weighed average value of construction cost per unit area of a specific class equivalent to the input desired total floor area, to a weighed average value of construction cost per unit area of a specific class equivalent to complex factors other than the input total floor area, to a weighed average value of construction cost per unit area of all data.

According to this invention, a data estimating system for estimating data value corresponding to desired factors by statistically processing a plurality of data having values determined from a plurality of factors, said system comprising: memory means for storing a plurality of data; classifying means for classifying data stored in said memory means into each class by discriminating said plurality of factors as basic factors and environmental factors, and classifying these basic factors and environmental factors using predetermined grades; weighed average value calculating means for calculating a weighed average value of data of the basic factors in each class, a weighed average value of data of the environmental factors in each class, and a weighed average value of all data; an input means for inputting desired factors as basic factors and environmental factors; and calculating means for estimating data value corresponding to desired factors on the basis of ratio of a weighed average value of a specific class equivalent to the input environmental factor, to a weighed average value of a specific class equivalent to the input basic factor, and to the weighed average values of all data.

According to this invention, data estimating system for estimating a construction cost of a building having desired factors including a desired total floor area by statistically processing construction cost of a plurality of buildings determined from factors including a total floor area, said system comprising: memory means for storing construction data of the plurality of buildings; classifying means for classifying building construction cost data stored in said memory means by classifying the total floor area and other factors using predetermined grades; input means for inputting desired factors including a desired total floor area; and a calculating means for estimating a construction cost corresponding to desired factors including the desired total floor area on the basis of a ratio of a weighed average value of construction cost per unit area of a specific class equivalent to factors other than the input total floor area, to a weighed average value of construction cost per unit area of a specific class equivalent to the input desired total floor area, and to a weighed average value of construction cost per unit of all data.

According to this invention, a data estimating system for estimating a construction cost of a building having desired factors including a desired total floor area by statistically processing building construction cost data of a plurality of buildings determined from factors including the total floor area, said system comprising: memory means for storing building construction cost data of the plurality of buildings; classifying means for classifying the building construction cost data stored in said memory means by classifying the total floor area and other data by predetermined grades; first input means for inputting desired factors including the desired total floor area; second input means for inputting factors to be complex among the desired factors other than the desired total floor area; and calculating means for estimating construction cost corresponding to desired factors including the desired total floor area on the basis of a ratio of a weighed average value of construction cost per unit area of a specific class equivalent to complex factors other than the input total floor area, to a weighed average value of construction cost per unit area of a specific class equivalent to a input desired total floor area, and to a weighed average value of construction cost per unit area of all data.

Although there have been developed a variety of statistical methods for estimating a value of the highest probability to be equivalent to desired factors by processing data determined from a plurality of factors, the data estimating system of this invention firstly divides these factors into basic factors and environmental factors, and then classifies the data group using predetermined grades. In this case, the basic factors are factors which would most generally affect on deciding the data value. A weighed average value in each class of the basic factors and the environmental factors are calculated and statistically processed, the weighed average of the basic factors is corrected with the ratio of the weighed average of the environmental factors to the weighed average of all data as a correcting element, so as to provide a final estimated value. In this manner, it is possible to obtain a result of high accuracy with a simple calculation by using the environmental factors as correcting element.

FIG. 24 shows a conceptual drawing of this invention. All data contained in a small mother group being composed of a plurality of data having been searched and extracted from a large mother group by use of grades (basic yardstick (A)) of basic factors and of environmental factors (environmental yardstick (B)). Rough estimation could be obtained by statistically processing (weighed-averaging) data classified into grades of basic factors containing desired factors, but this method is unable to provide accurate estimated values since these data are affected also by other factors. In view of this, a ratio of a value obtained by statistically processing data classified into grades of environmental yardstick containing desired factors to the total value is considered to be a magnitude of influence that the environmental factor affects the data i.e. degree of influence, so that an accurate estimation becomes possible by correcting the statistical process of basic yardstick by this degree.

A data estimating system according to this invention is particularly aimed at estimating an approximate construction cost of a building, a system for estimating an approximate construction cost determined from a plurality of factors such as total floor area and construction site. The approximate construction cost can be calculated by multiplying square-meter costs for the building by total floor area. For estimating this square-meter costs for the building, the aforementioned statistical process is used. In this case, the basic factor is the total floor area and the environmental factor is a factor, other than the total floor area, which would affect the construction cost such as having or not having basement floor, construction site, designer.

A data estimating system according to this invention is for estimating an approximate construction cost, but by taking the environmental factors in a complex manner into consideration. Namely, if it is desired to estimate the construction site and whether basement floor exists or not with the same weight, an weighed average is calculated by classes of complex factors so as to provide an approximate construction cost.

On the other hand, a data estimating system according to this invention calculates weighed average values in each class of the basic and environmental factors and statistically processes them, but calculates a ratio of weighed average in each class of the basic factors to a weighed average of all data as a basic factor distribution. The basic factor distribution is then multiplied by a weighed average value of each class of the environmental factor as a characteristics value, so as to provide a final estimation. In this manner, it is possible to make estimation of influence which an environmental factor acts on the data by calculating a ratio of a value obtained by statistically processing data classified by the basic factor to the whole small mother group as the basic factor distribution, and then multiplying the basic factor distribution by a weighed average value of data classified into grades of environmental yardstick containing desired factors.

A data estimating system according to this invention is for estimating particularly an approximate construction cost of a building in a data estimating system, which estimates an approximate construction cost of a desired building having been determined from a plurality of factors such as total floor area and construction site. The approximate construction cost can be calculated by multiplying square-meter costs for the building by the total floor area. For estimating this square-meter costs for the building, the statistical process aforementioned is used. In this case, the basic factor is the total floor area, while the environmental factors are those, other than the total floor area, that affect the construction cost, such as existence of basement floor, construction site, and designer etc.

A data estimating system according to this invention is for estimating an approximate construction cost but by taking the environmental factors into consideration in a complex manner. Namely, for estimating the existence of basement floor and construction site of a desired building with the same weight, a weighed average is calculated in each class of complex factors so as to provide the approximate construction cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 is a diagram for explanation of environmental scaling key setting according to an embodiment of this invention;

FIG. 10 is a diagram for explanation of data input screen according to an embodiment of this invention;

FIG. 15 is a diagram for explanation of scaling output screen of own statistical data according to an embodiment of this invention;

FIG. 16 is a diagram for explanation of scaling output screen for statistical data of other company according to an embodiment of this invention;

FIG. 17 is a diagram for explanation of simulation screen for own statistical data according to an embodiment of this invention;

FIG. 18 is a diagram for explanation of simulation screen of statistical data of other company according to an embodiment of this invention;

FIG. 22 is an explanatory view of scaling output screen according to the second embodiment of this invention;

FIG. 23 is an explanatory view of a simulation screen according to the second embodiment of this invention;

FIG. 25 is an explanatory view of scaling output screen for own statistical data according to the second embodiment of this invention;

FIG. 26 is an explanatory view of simulation screen for own statistical data according to second embodiment of this invention;

DETAILED DESCRIPTION

A preferred embodiment of a data estimating system according to this invention will now be described referring to drawings with a rough construction cost for a building as an example.

First Embodiment

Figure 1:
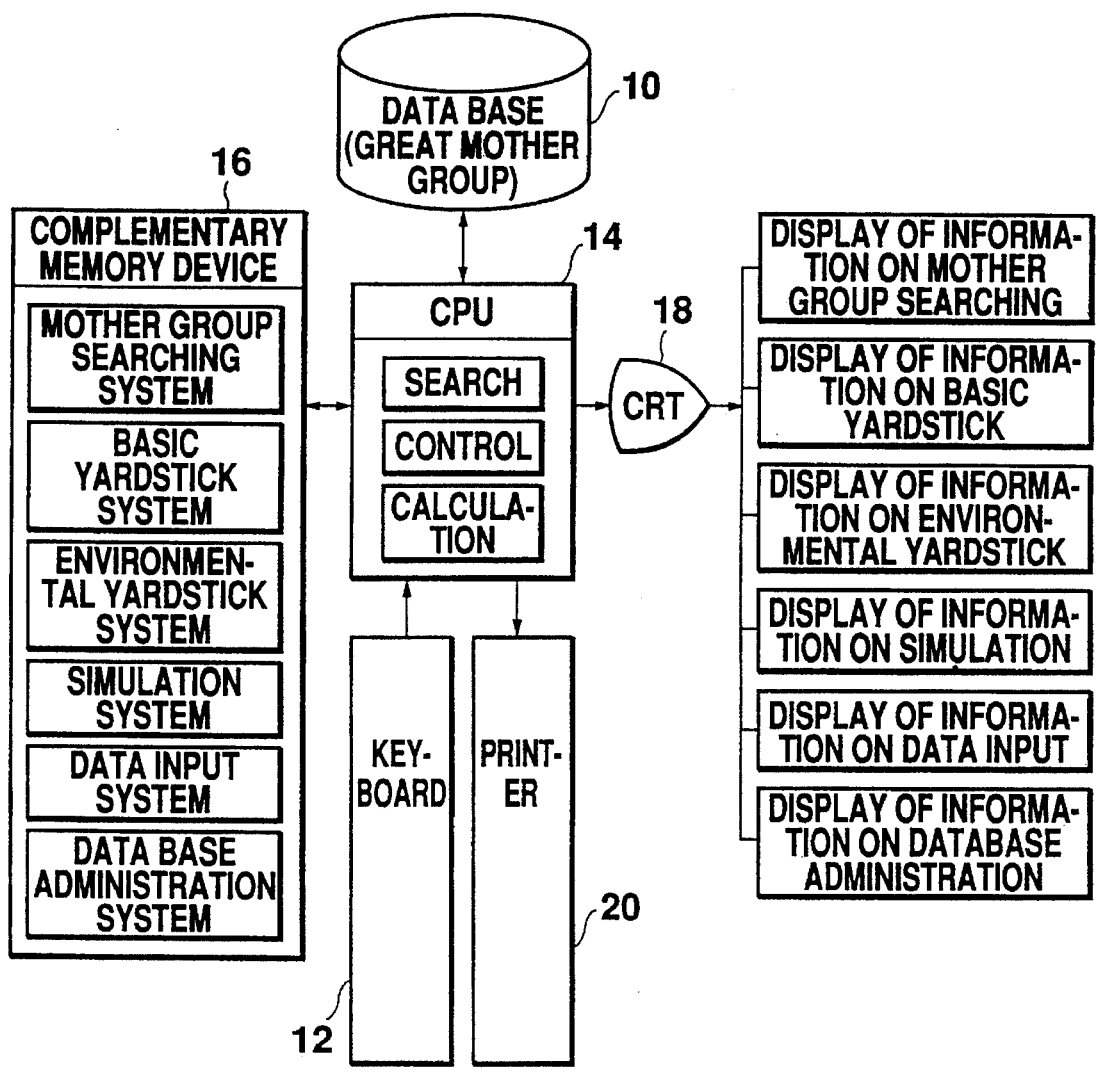
FIG. 1 is a block diagram showing a composition according to an embodiment of this invention.

FIG. 1 shows a system composition of a first embodiment of this invention. This system comprises a memory device (data base) 10 for storing data for building construction, input/operation device 12 such as a keyboard for inputting commands like search by the operator, a CPU 14 for making access to the data base 10 in response to the command input through the input/operation device 12 and making processes such as of searching, a subsidiary memory device 16 for storing programs for the calculation to be carried out in the CPU 14, a CRT 18 for displaying the result of the process in the CPU 14, and a print output device (printer) 20 for printing the processed result in the CPU 14. The data base 10 stores information on: buildings of other companies (other company's work); statistical data of own company; and statistical data of other companies. The subsidiary memory device 16 stores programs for searching a desired property in accordance with the command input through the input/operation device 12 and simulation programs for estimating rough construction cost of the building based on the statistical data of other company. In this embodiment, the application programs stored in the subsidiary memory device 16 are, as shown in FIG. 1, mother group searching system, basic scaling system, environmental scaling system, simulation system, data input system, and data base administration system.

The mother group searching system is for searching a property meeting the searching conditions (e.g. use of the building, type of the body structure of the building, and constructed year etc.) having been input through the input/operation device 12 from the data base 10. The basic yardstick system and the environmental yardstick system are for setting the basic yardstick and the environmental yardstick which are the basic principles of the present invention. A total floor area is set as the basic yardstick, while items like subbasement, execution site of construction, the orderer, contract type, and designer are set as the environmental yardstick. Namely, although the rough construction cost of a building would be calculated from a variety of factors, the basic factor for affecting generally the construction cost is the total floor area, which would therefore be adopted as the basic yardstick. The existence of the subbasement and the execution site of construction are considered to be complementary factors of to what extent would increase the construction cost which is almost determined by the total floor area so as to be used as environmental yardstick which can be set freely by any desired one of conceptional input method and numerical input method. Then weighed average at each section of the small mother group for search having been classified by the determined basic yardstick or the environmental yardstick (the meaning of the classification will be explained hereafter). The simulation system is for estimating the approximate construction cost by combining the basic yardstick and the environmental yardsticks. It would be operated sequentially in a order as the searching system, scaling system and the simulation system when started, so as to output the final value of the construction cost.

Figure 2:
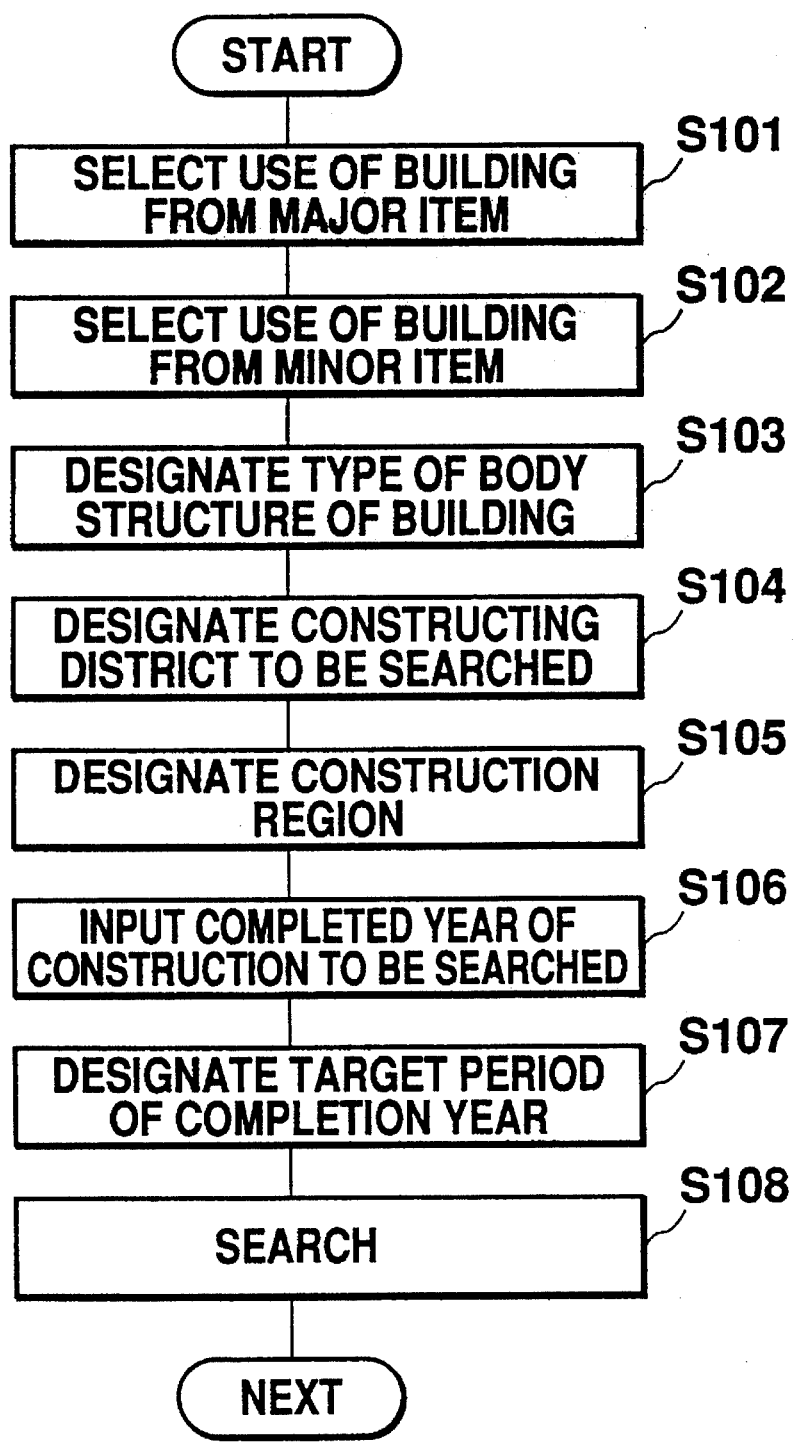
FIG. 2 is a flow diagram of search system according to an embodiment of this invention.
Figure 3:
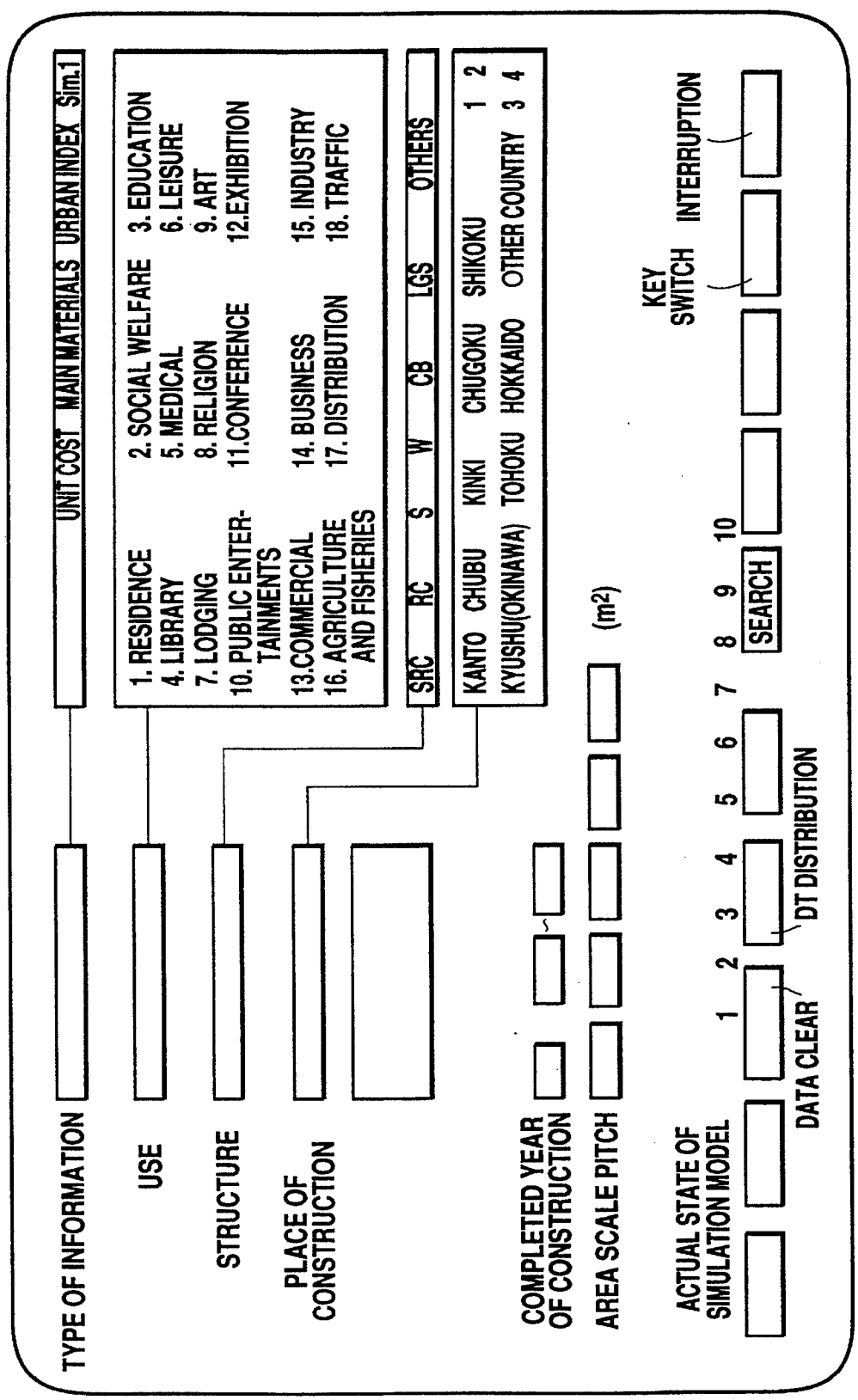
FIG. 3 is a diagram for explanation of a search-processing screen according to an embodiment of this invention.

Each of these systems will now be described individually in more detail. FIG. 2 shows a searching flow chart at the time of starting the searching system, while FIG. 3 shows an example of the screen display at that time. This searching system extracts a group of properties (small mother group) meeting the conditions desired by the operator from data (mother group) stored in the data base 10. There would be a variety of factors for extracting a small mother group from a grand mother group, but particularly in this embodiment it is extracted on the basis of the use of the building, body structure of the building, constructing site, and completed year of the construction. Specifically, the use of building is selected from the large item (S 101). The large item is shown in FIG. 3 and is classified into 1. residential, 2. welfare, 3. education, 4. library, 5. medical treatment, 6. leisure, 7. lodging, 8. religion, 9. art, 10. art of public entertainment, 11. meeting, 12. exhibition, 13. commerce, 14. business, 15. industry, 16. agriculture and fisheries, 17. distribution industry, and 18. traffic. A desired use is selected from them by use of the input/selection device. Upon large item selection, the small item selection is made (S 102). For example, when 14. business is selected as the large item, the screen display is changed to display office, government building, bank, post office, broadcasting installation, research installation etc. which have been previously set for 14. business. Any item of them can be selected. When the selection of the building use is finished, then the selected items being displayed on the screen will be sequentially selected (S 103–S 107).

Namely, designation of: body structure type (S103), constructing site of the building (S104), target constructing site of the building (S105), completed year of construction (S106), and target period of construction (S107). After designating these items, the CPU 14 searches data of a property meeting the conditions by accessing the data base 10 (S108).

After the statistical data which would be the base for calculating the rough construction cost are searched and the small mother group is extracted, the scaling system which is a base for estimating the rough construction cost of the building meeting the desired conditions (having or not having subbasement, the execution site of construction is in business quarters etc.) and desired total floor area will be set. As previously described, this scaling system is composed of the basic yardstick (in this embodiment the basic yardstick will be referred to as area yardstick hereafter since the total floor area is used as the basic yardstick) and the environmental yardstick. The small mother group having been extracted by the searching system is classified on the basis of these yardsticks, and the weighed average value would be calculated within each class. The area yardstick is classified with a pitch space being freely designated, while the environmental yardstick is classified as any interested item or value as a pitch. Each of the area yardstick and the environmental yardstick will now be described in detail.

Figure 4:
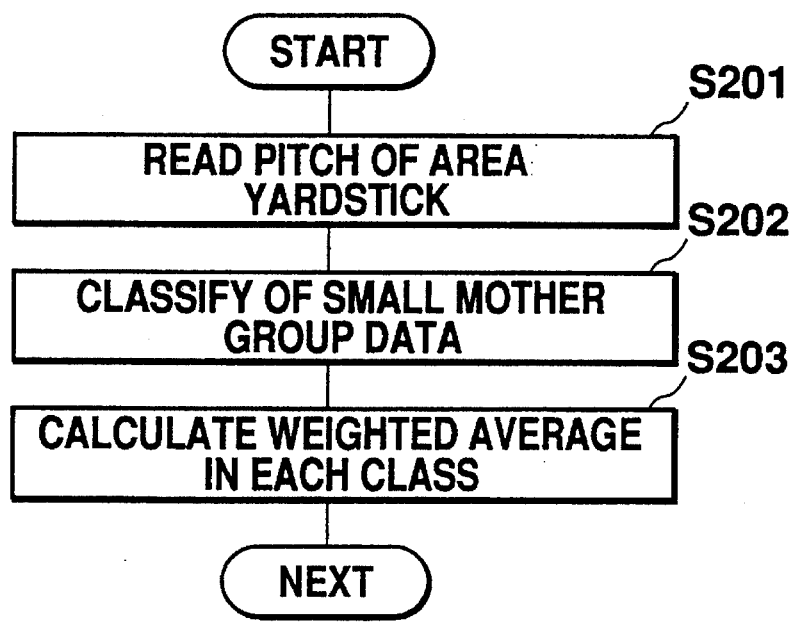
FIG. 4 is a flow diagram of scaling system (area yardstick) according to an embodiment of this invention.

The area yardstick has a unit of total floor area for classifying the data of the small mother data with a grade of the total floor area. The grade of the total floor area can be appropriately selected by the operator. FIG. 4 shows a flow diagram of the area scaling system. As shown in FIG. 1, the pitch of the area yardstick is set through the input/operation device (S201). The screen for setting pitch is displayed at the lower part of the aforesaid screen of FIG. 3. After deciding the pitch of the area yardstick, the data of the searched small mother group will be classified using this area yardstick (S202). Thus, all data within the small mother group will be classified into any of the class. In this case, the data classified into the same class would have the same grade in view of the total floor area, but would have different grade in view of other factors such as existence of subbasement or execution site of construction. After the classification of the small mother group has been performed, the construction cost for the total floor area of the data contained in each class (unit value for so-called m$^2$) will be calculated by weighed averaging (S203). The construction cost by way of the weighed averaging would be calculated by the following equation when the property data contained e.g. in grade ai of the area yardstick are designated as a, b, c and the total floor area and the construction cost of each property are designated respectively as (Aa, Ma), (Ab, Mb), (Ac, Me):

$$\text{unit value P for m}^2 = (Ma+Mb+Me)/(Aa+Ab+Ae)$$

Figure 5:
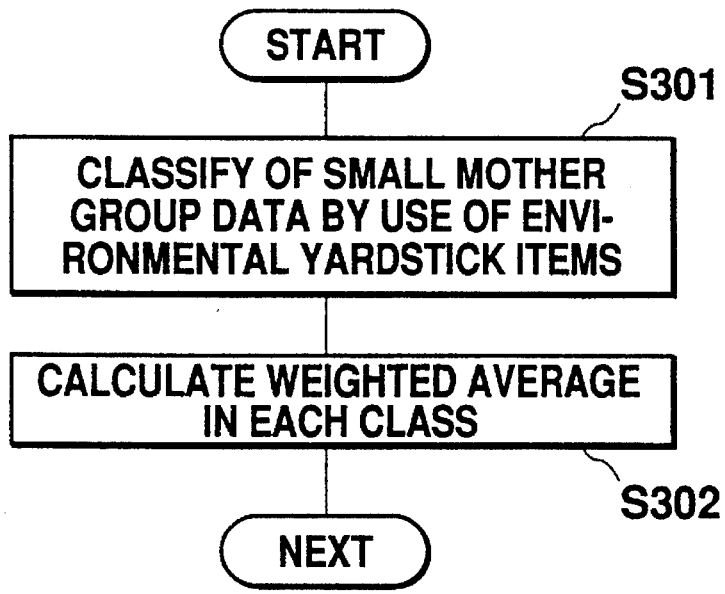
FIG. 5 is a flow diagram of scaling system (environmental scaling) according to an embodiment of this invention.
Figure 6:
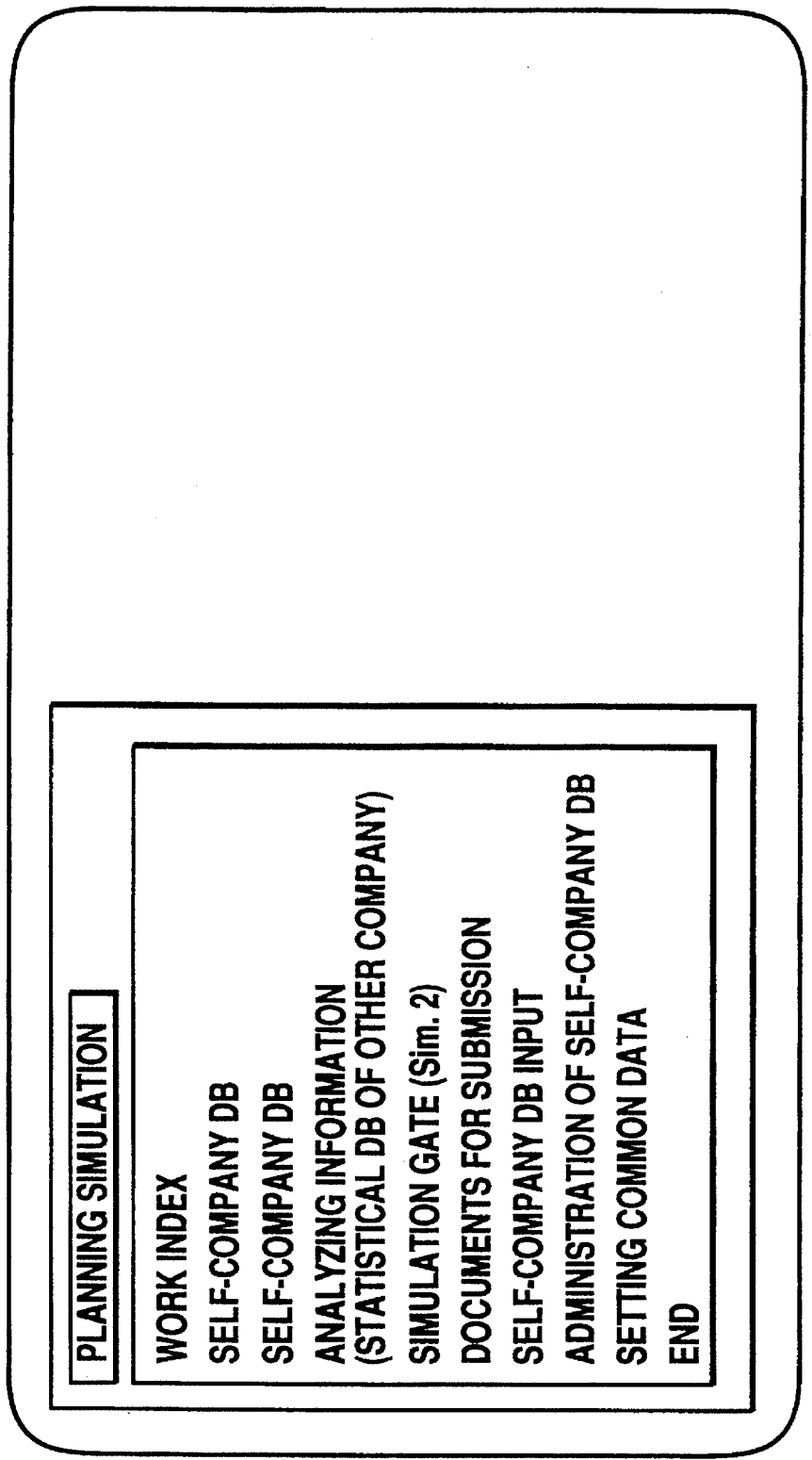
FIG. 6 is a diagram for explanation of main menu according to an embodiment of this invention.
Figure 7:
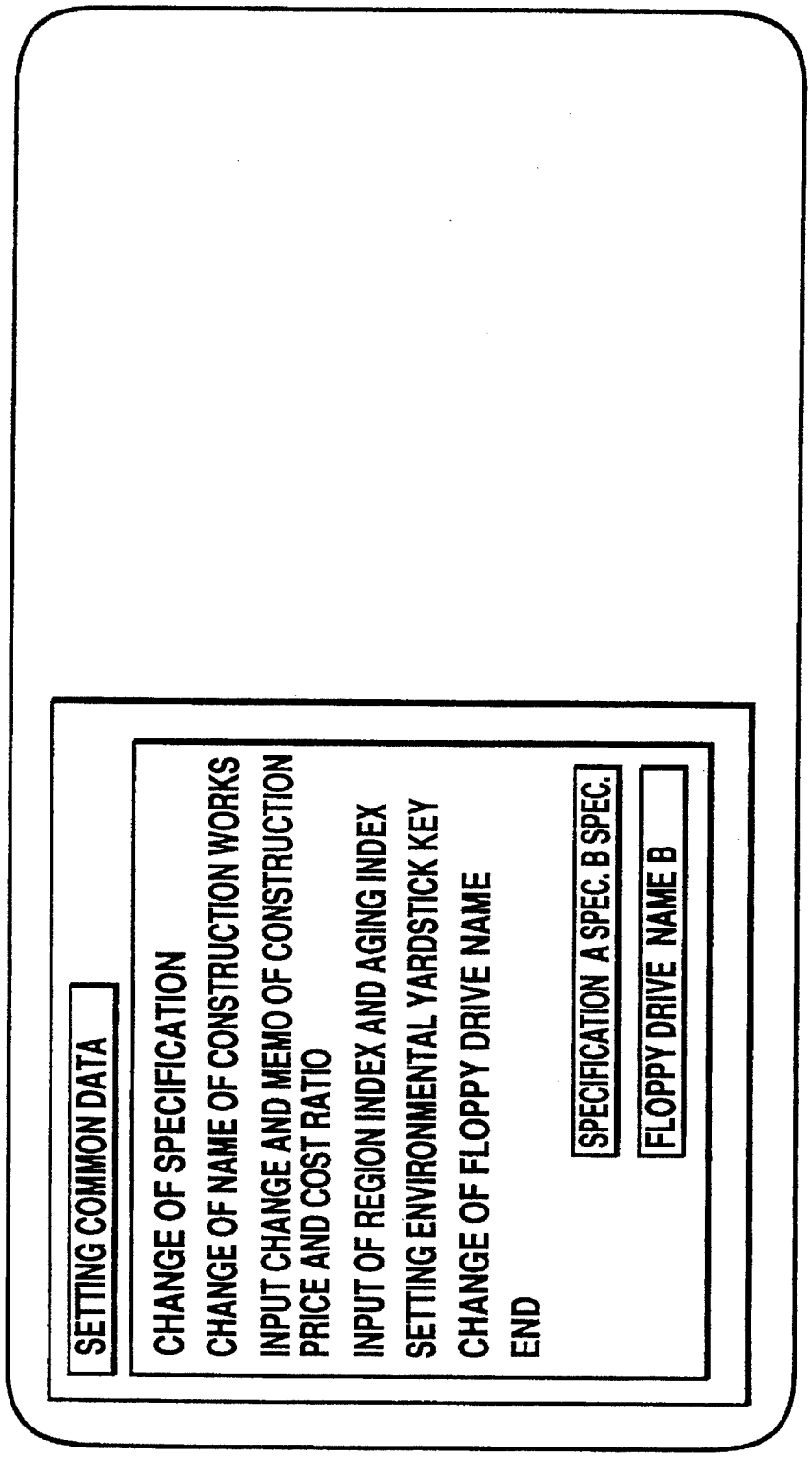
FIG. 7 is a diagram for explanation of common data setting according to an embodiment of this invention.
Figure 8:
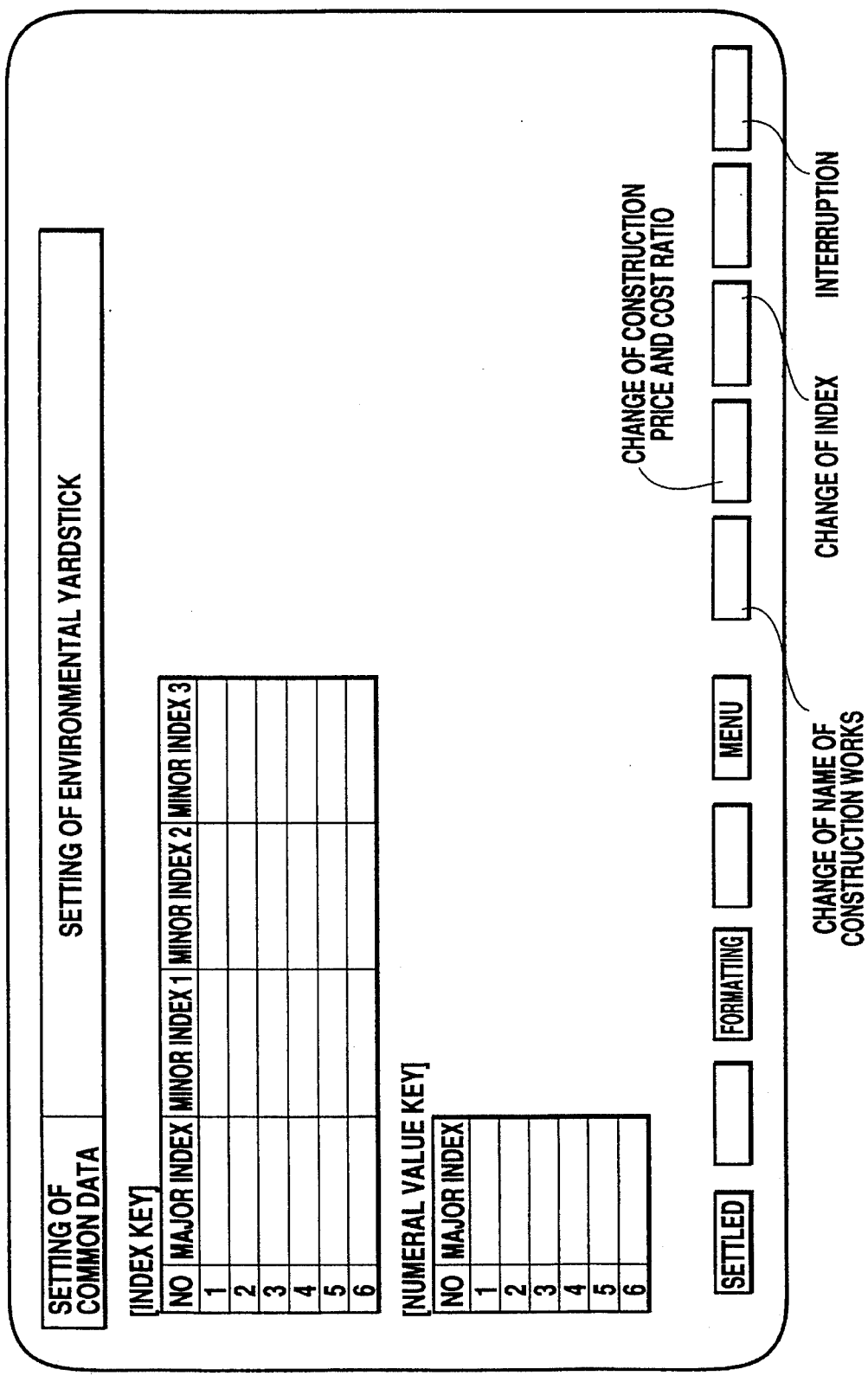
FIG. 8 is a diagram for explanation of environmental scaling key setting according to an embodiment of this invention.
Figure 10:
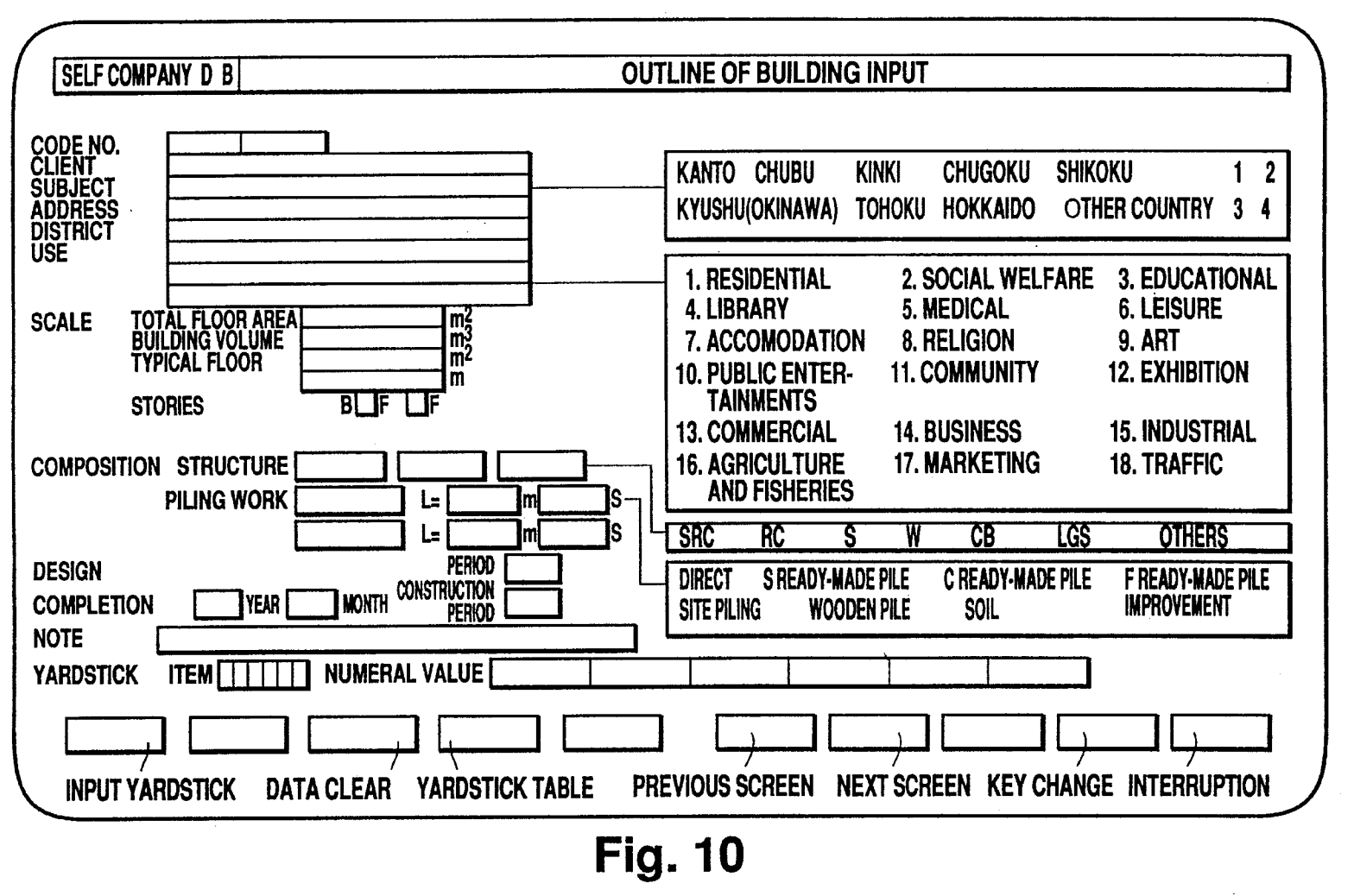

Meanwhile, the environmental yardstick could be set by the operator in any of various forms including: characteristics of construction site (urban area, downtown, suburbs), site condition (flat, slope), basement floor (included or not included, having basement 1, having basement 2), bidding conditions (public tender, private tender, design and construct), shape of building (simple, a little complicated, complicated), exterior wall ratio (amount of exterior wall per total floor area), opening ratio (ratio of area of windows and entrance/exit to exterior wall area). FIG. 5 shows a flow diagram of an environmental yardstick system, and FIGS. 6–10 show an example of displayed environmental yardstick input screen. In the ease of data base of self company composed of statistical data of works of self-company, the environmental yardstick is classified into items to be input as concept and those to be input as numeral value. For setting such environmental yardstick, the item "setting common data" is selected in the main menu shown in FIG. 6. The main menu is a screen firstly displayed on the CRT when scaling system starts. After the "common data" is selected, a screen shown in FIG. 7 is displayed. This screen includes items such as change of specification, change of construction type, change of cost rate, input of district and aging index, setting of environmental yardstick key, and change of floppy drive name. By these operations, the basic environment at the time of simulation can be established. In this screen, when "setting environmental key" is selected, the screen will be changed as shown in FIG. 8. This screen is for inputting key items of the environmental yardstick which the operator (user) considers important. The key for items as concept is classified into large item and small items being the contents thereof, and the numeral item can be input only by the large item. FIG. 9 shows an example where these items have been input. Place of construction (urban district, suburb etc. as small items), ground state (flat, slope, creation), plane (simple, a little complicated, complicated), cubic plane (simple, a little complicated, complicated), grade (standard, good, excellent) are input as concept, while opening ratio, exterior wall ratio, and ratio and area of well, piroty, and balcony are input as numeral values.

When the operator inputs data, the conceptional items are encoded to be input, while the numerical items are input as numerical value that the building has for the corresponding item.

As environmental yardstick of data of other company, basement floor (having or not having), place of construction (business quarters, normal urban district, etc.), orderer (government and municipal offices, public agencies, public corporations, private), manner of contract (tender, estimation, special order), designer (design office, design and execution of construction, building and repairs). The grades of each item appears inside the parenthesis.

After the yardstick has been determined, the small mother group in each item will be classified (S301). For example, when whether having basement floors or not and the characteristics of the construction place are set as the environmental yardstick, the data will be divided into two types of data, having subbasement and having no basement, and into three types of data of normal urban district, business quarters, and suburbs. Of course, if the existence of basement floor is set as yardstick, the data of property having basement floor will contain data having a variety of total floor area. After the small mother group is classified by the environmental yardstick, the construction cost per total floor area of data contained in each class (so-called unit value per $m^2$) will be calculated by weighed averaging in the same manner as the aforesaid case of the area yardstick (S302).

Figure 11:
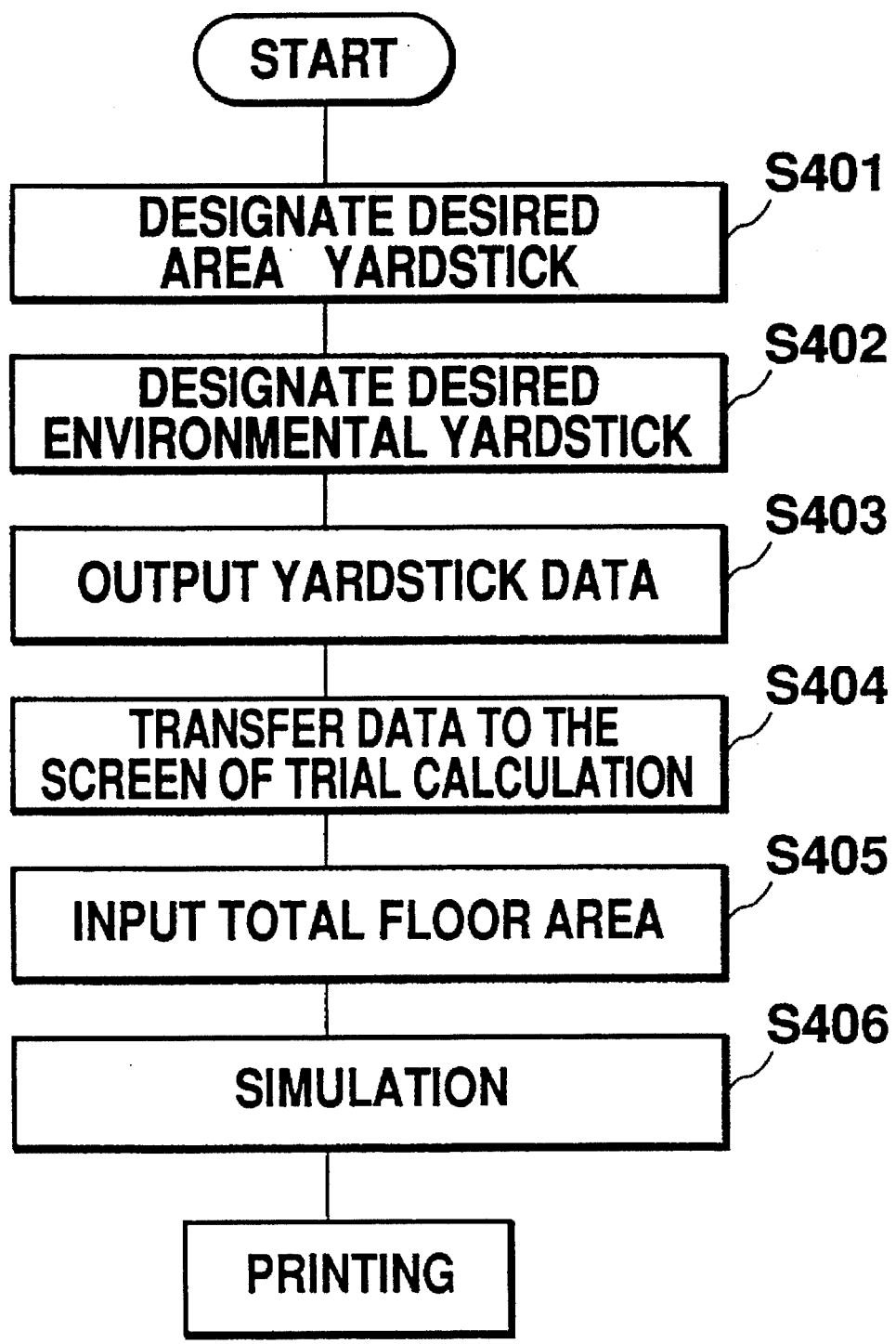
FIG. 11 is a flow diagram of a simulation system according to an embodiment of this invention.
Figure 12:
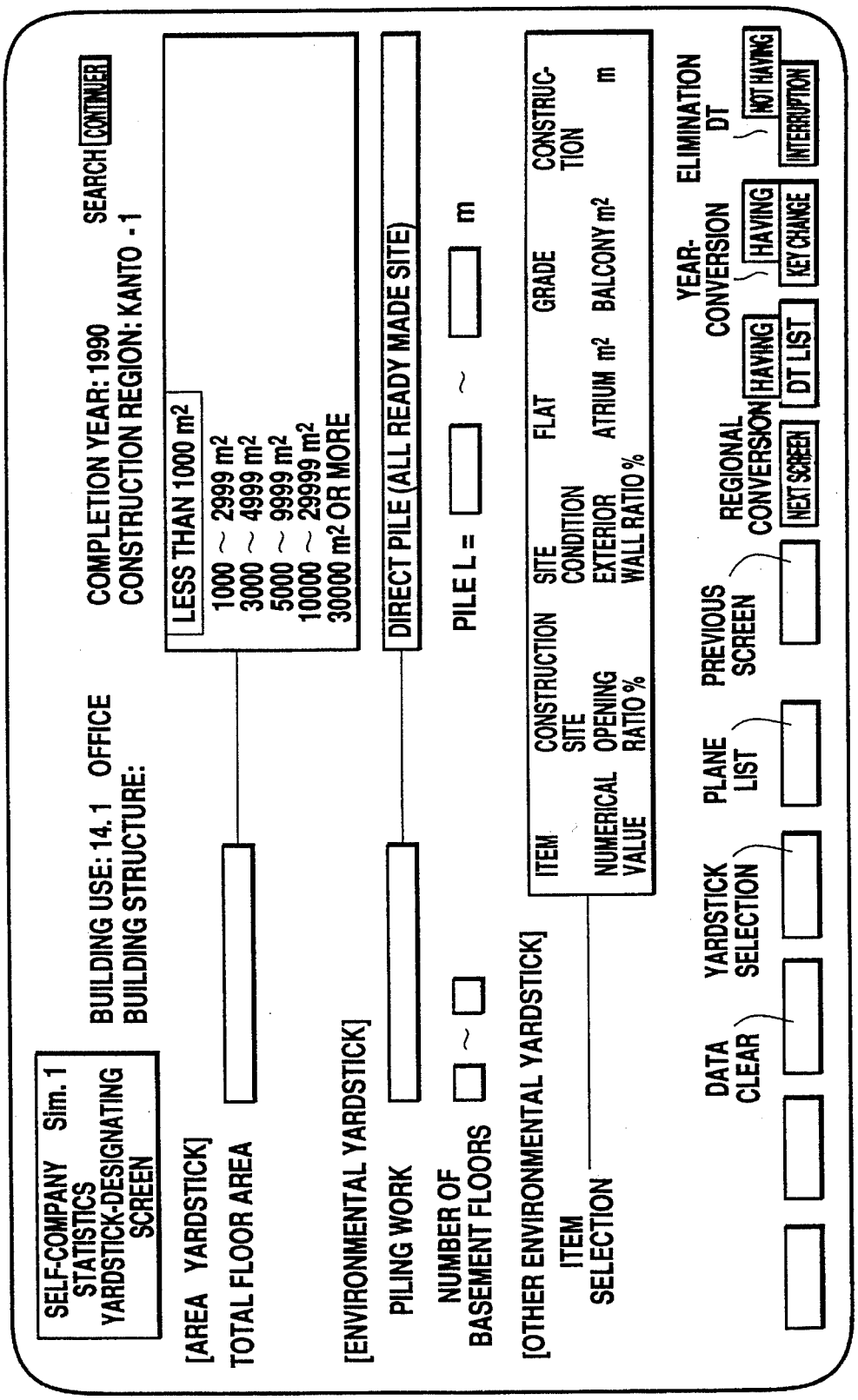
FIG. 12 is a diagram for explanation of scaling designation input screen for own statistical data according to an embodiment of this invention.
Figure 13:
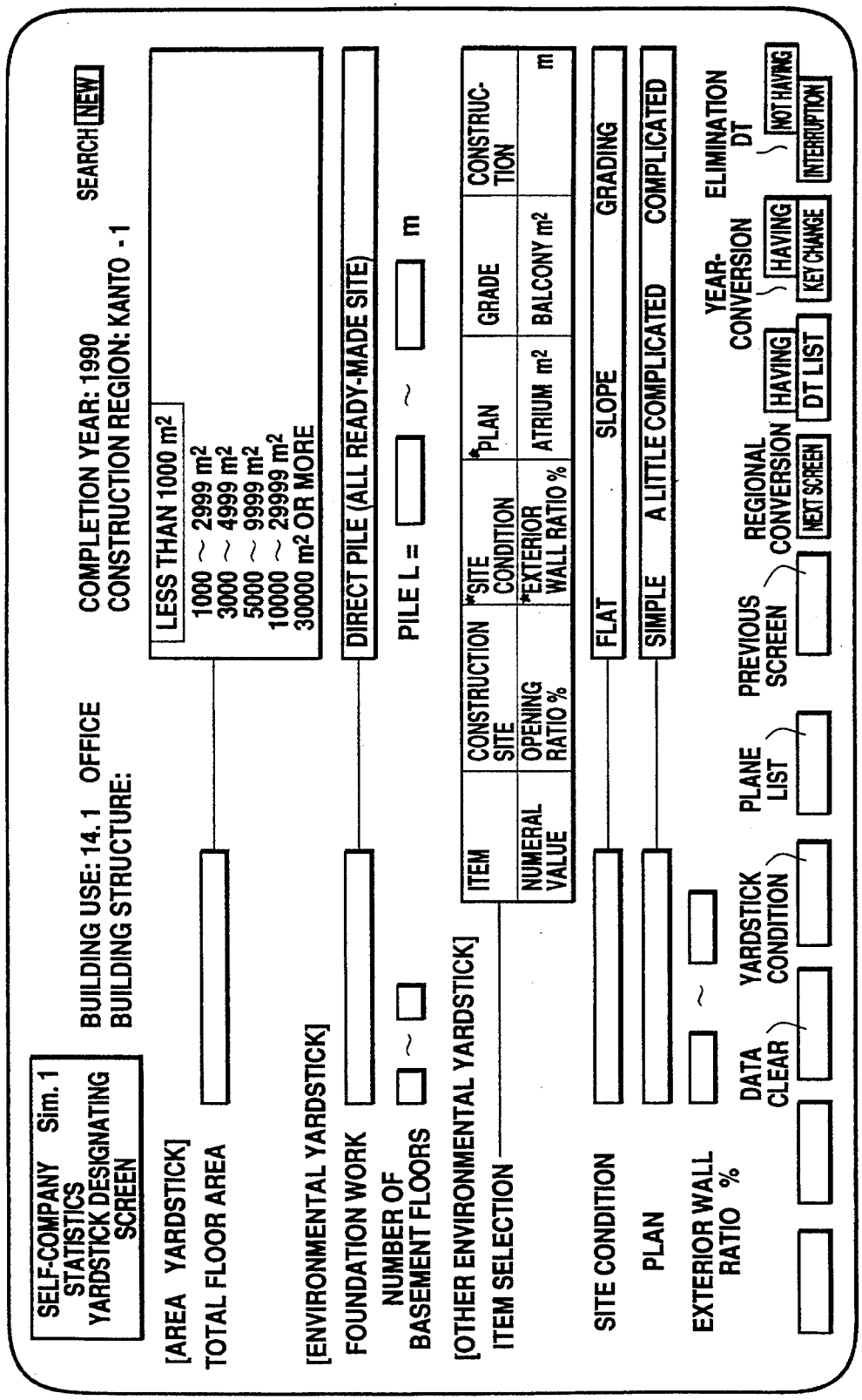
FIG. 13 is a diagram for explanation of scaling designation input screen for own statistical data according to an embodiment of this invention.
Figure 14:
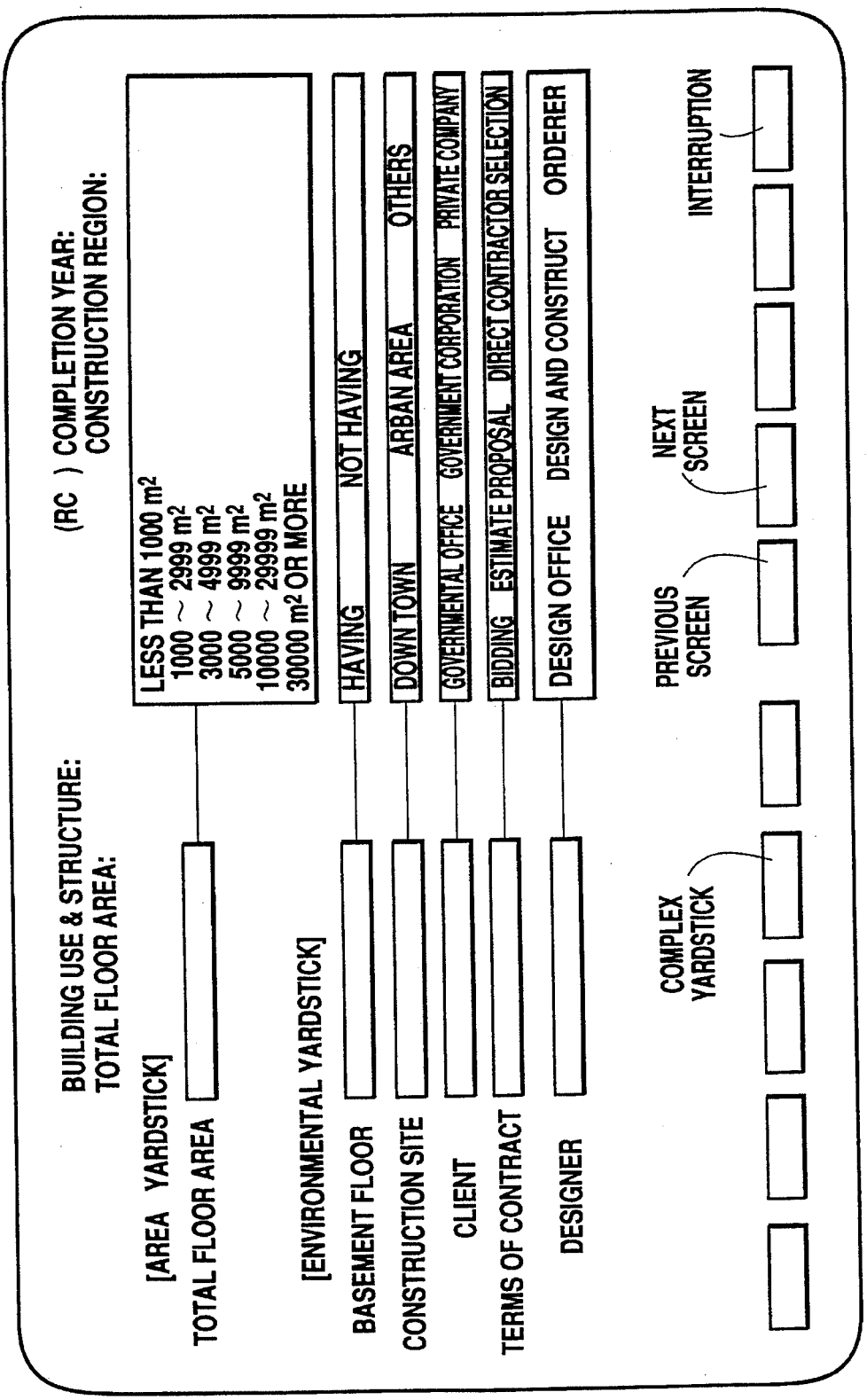
FIG. 14 is a diagram for explanation of scaling designation input screen of statistical data of other company according to an embodiment of this invention.

After the classification is made using the area yardstick and the environmental yardstick and the weighed averaging is carried out in each class, the process will shift to calculation of the approximate cocnstruction cost, i.e. simulation system. FIG. 11 shows a flow diagram of a simulation system. Firstly, desired area yardsticks and environmental yardsticks are designated (S401, S402). This is carried out by designating the grades of the area yardsticks containing the total floor area of a building and the grades of the environmental yardsticks of the building desired by the operator. FIG. 12 shows an example of the yardstick designating screen for the statistical data of self-company. In this screen, the area yardstick and the environmental yardstick are individually designated, and the environmental yardstick set by the user will be output as item selection of "other environmental yardstick" in the statistical yardstick designating screen of self-company. In this screen, "work item" and "number of basement floors" are displayed as fixed items among the area yardstick and the environmental yardstick. This means that these items largely affect the construction cost. For designating items other than these items, a desired item among the aforementioned item selection is designated and input. An example of screen display in the case of designating other environmental yardsticks in FIG. 13. In FIG. 13, the items with * mark shows to be designated items. On the other hand, FIG. 14 shows an example of yardstick designating screen of statistical data of other company. The grades of the set environmental yardsticks are displayed so as to be freely selected.

After the area yardstick and the environmental yardstick of the property that the operator desires to calculate the approximate construction cost thereof, the yardstick data is output (S403). In this case, the yardstick data signify the value of weighed average of designated grade among the grades of the environmental yardstick grades and would have a unit of 1000 yen/m because of being a unit price for a unit area. FIG. 15 shows an example of yardstick output screen of statistical data of self-company, while FIG. 16 shows an example of yardstick output screen of statistical data of other company. The items of the statistical data of self company are total floor area, work item, number of basement floors, site condition, plane, and exterior wall ratio which correspond to the items of the area yardstick and the environmental yardstick, while the items of other statistical data are total floor area, basement floors, construction site, client, terms of contract, and designer. For both the self-company and the other company, the output items are: 0. items, 1. contract amount, 2. construction cost, 3. net construction cost, 4. net architectural work cost, 5. net building equipment work cost, 6. earthwork and piling work cost, 7. structural work cost, 8. finishing work cost. The ratio of overheads and administrative expenses calculated from these items are output at the same time.

After outputting the yardstick data, the yardstick data are transferred to the simulation screen (S404) and the total floor area of the building to be estimated is input (S405), the simulation is carried out (S406). This simulation is performed by multiplying the ratio obtained by dividing the environmental yardstick data by the total weighed average data by the area yardstick data. Namely, the approximate construction unit price will be calculated by multiplying the ratio of the area yardstick data to the basement floor yardstick data, and then will be multiplied by the input total floor area to provide the expected construction cost. In the same manner, the expected construction cost is calculated based on the data ratio of the area yardstick data to the environmental yardstick, and the maximum price of the expected construction cost is determined as the final approximate construction cost. FIGS. 17 and 18 show an example of the simulation screen of the statistical data of self-company and other company, respectively.

In this manner, according to this embodiment, such concept as the basic yardstick (area yardstick) and the environmental yardstick are introduced to be used for the classification of data and for calculation of weighed average of grades of a desired building, so that the approximate cost calculated from the area yardstick is corrected by the use of the environmental yardstick for accurate estimation of the approximate construction cost. In this manner, it would be possible to carry out the estimation with quite simple system at high accuracy. The present inventor has confirmed that the building estimation system according to this embodiment can calculate approximate construction cost with an error rate of approximately just 5%.

Although the present invention has shown a case in which the approximate construction cost is treated in the same manner regardless of the work item, it would of course be possible to estimate the construction cost for each work item.

Further, in this embodiment, the area yardstick and the environmental yardstick are used, the former for the calculation of the weighed average independently at each item to be multiplied then by the latter yardstick, resulting in the approximate construction cost. However, the approximate construction cost could also be calculated by the use of such environmental yardstick in a complex manner.

Figure 19:
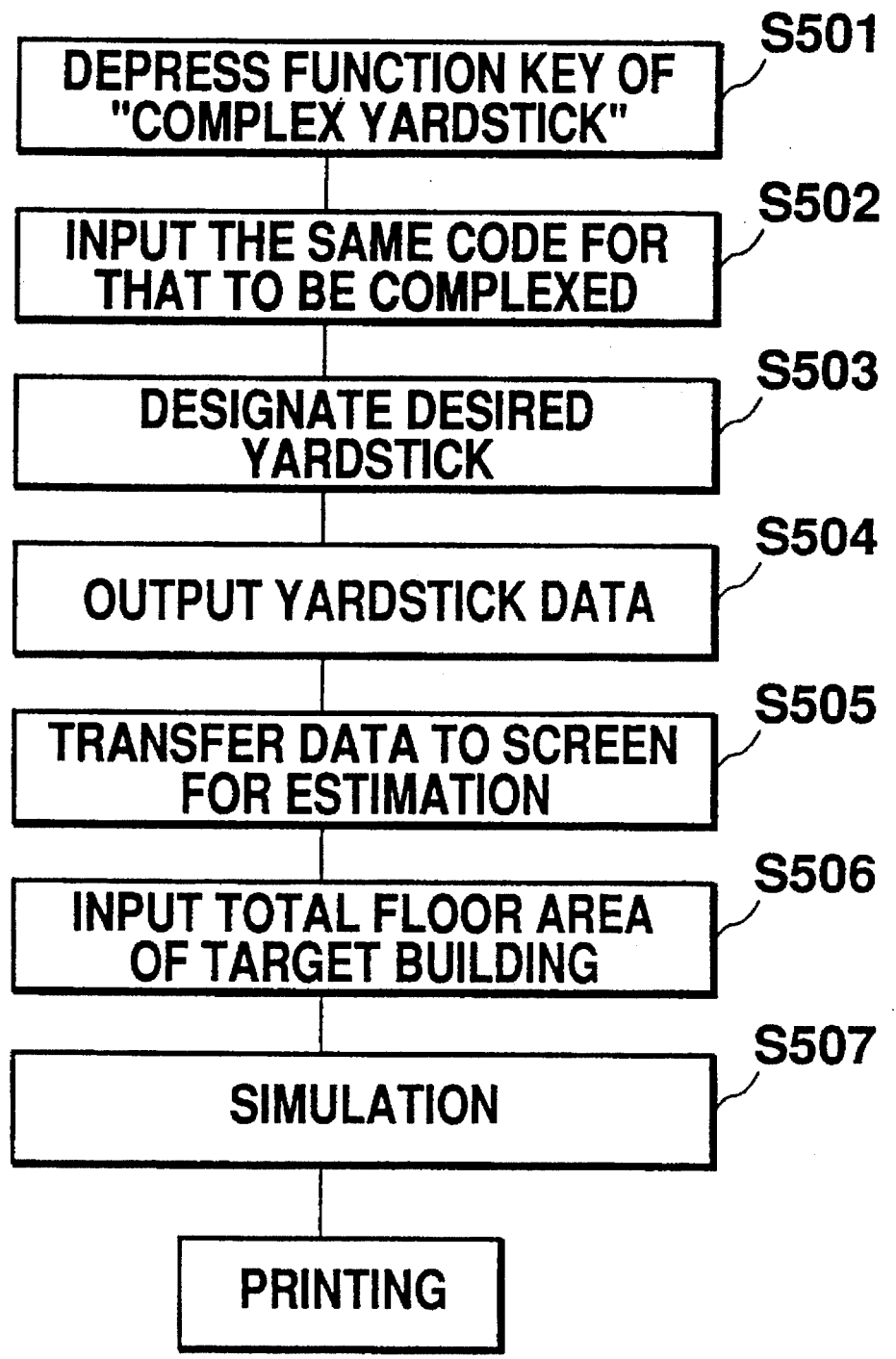
FIG. 19 is a flow diagram of simulation system according to a second embodiment of this invention.
Figure 20:
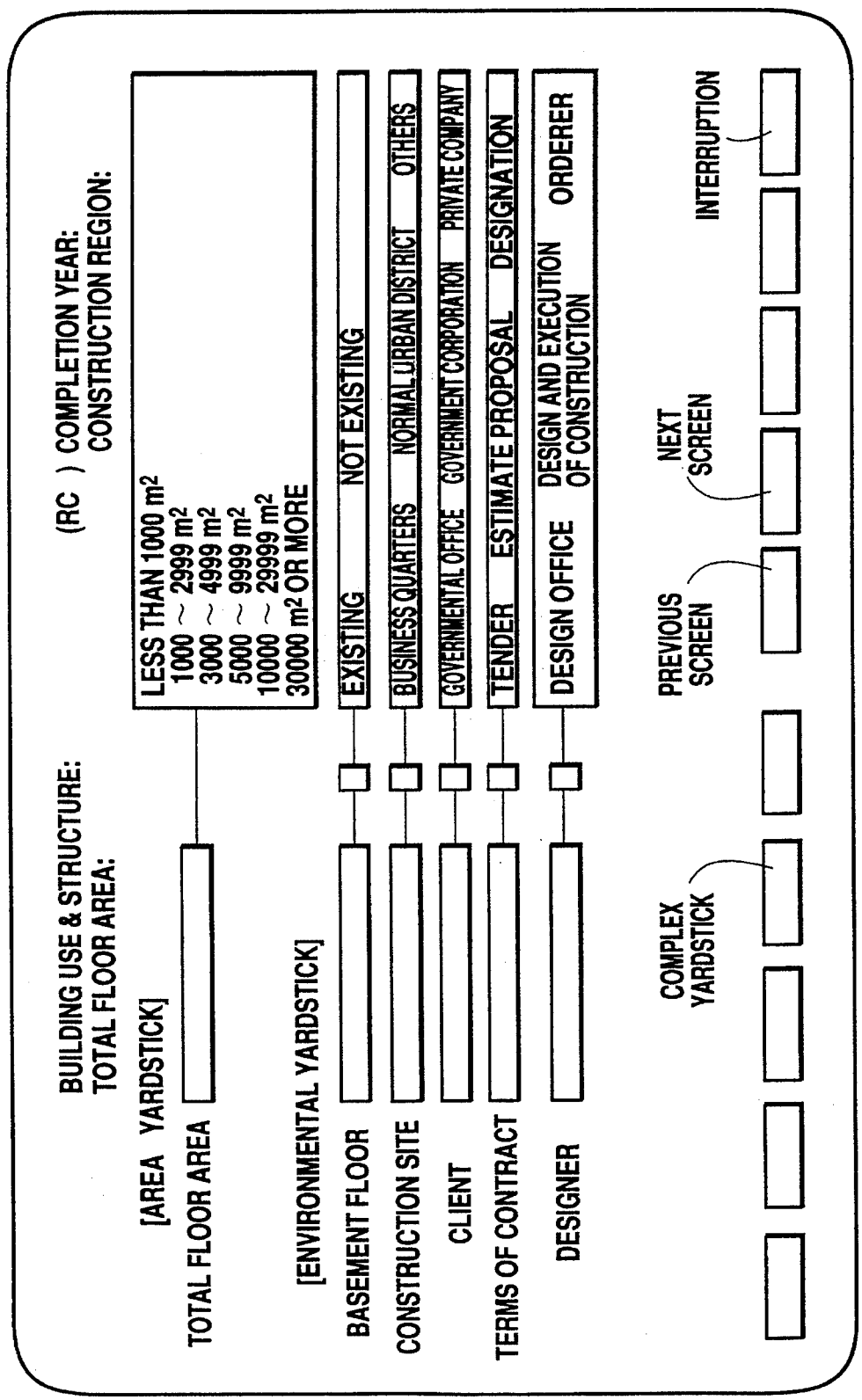
FIG. 20 is a diagram for explanation of scaling designation input screen according to an embodiment of this invention.
Figure 21:
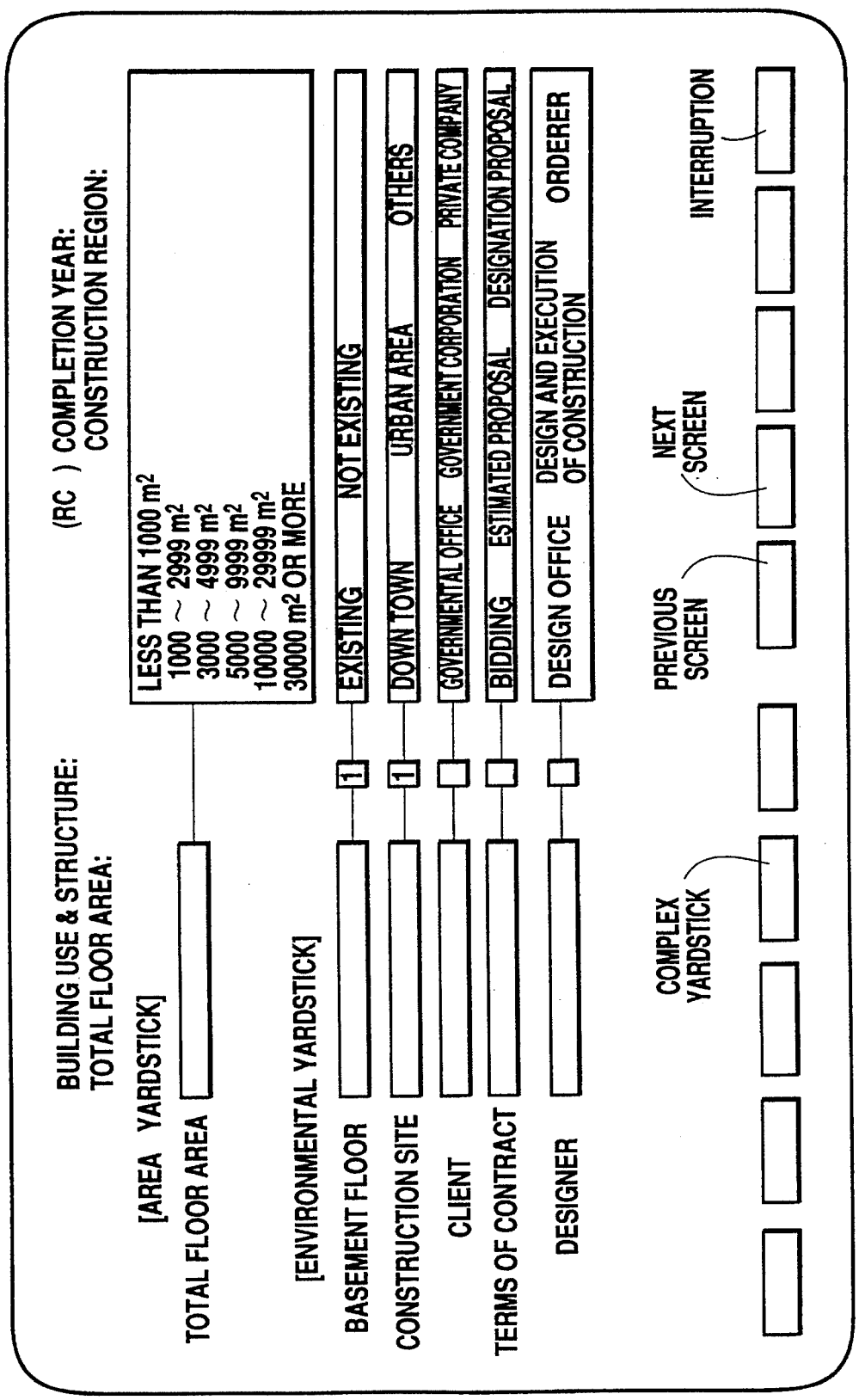
FIG. 21 is an input explanatory view of complex items according to a second embodiment of this invention.
Figure 24:
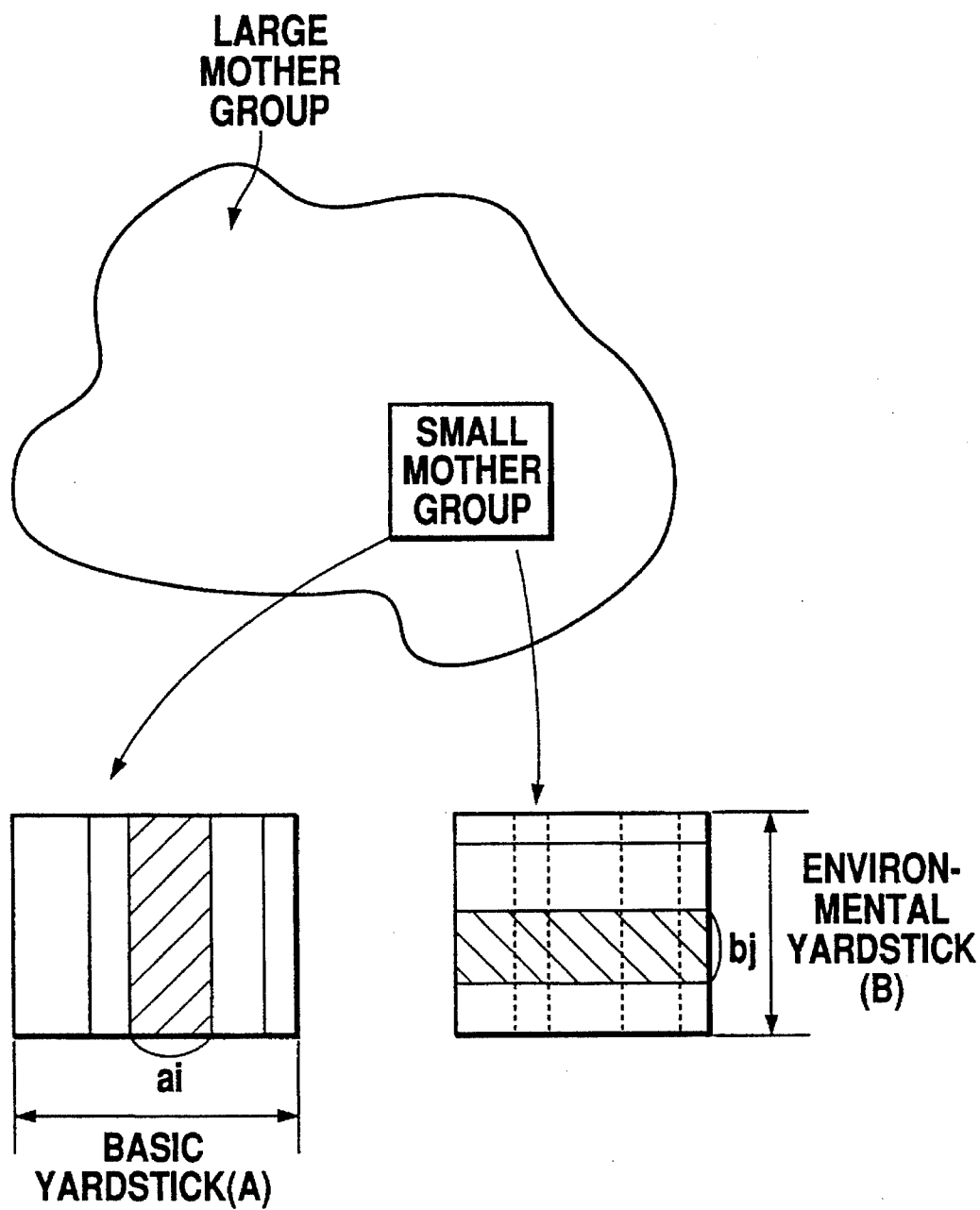
FIG. 24 is an explanatory view of principles of this invention.

FIG. 19 shows a flow diagram of a case in which the environmental yardstick are used. First, a function key "complex yardstick" is selected from the function key group shown in the lower part of the yardstick designation input screen shown in FIG. 14. Then a screen shown in FIG. 20 appears for the designation of the environmental yardstick item desired to be complexed. If "basement floor" and "construction site", and "terms of contract" and "designer" are respectively complexed, the same code is input to each item for the designation of the complex item (S502). FIG. 21 shows an example of a screen having been designated by such a manner, in which code 1 is input to the "basement floor" and "construction site", while code 2 is input to the "terms of contract" and "designer". After the item of the environmental yardstick to be complexed are designated, the small mother group is classified by the same items as in the case of aforementioned environmental yardstick independent process for calculating the weighed average. Since the environmental yardstick are complexed, the classification is carried out with regard to the two items in the small mother group, "basement floor" and "construction site" (in the like manner for the case of "terms of contract" and "designer"). Namely, if "basement floor" has two grades of having and not having basement floor and "construction site" has three grades of downtown, urban area and other, the complex yardstick of "basement floor" and "construction site" would have six grades. As a result, the small mother group would be classified into six grades, and the weighed average would be calculated for each class.

After the complex yardstick is set in this manner, the required environmental yardstick are designated (S503). This designation is performed by selecting either one grade of each item displayed on the yardstick designation screen shown in FIG. 21. As a consequence, the yardstick data i.e. the values of the weighed average of the designated grade of the area yardstick and the environmental yardstick are output (S504). The value of the complex item is output to the output region of the first item (in the case of "basement floor" and "construction site", it is "basement floor") among the items designated to be complexed.

These data are transferred to the simulation screen (S505), and the total area of the desired building is input (S506), and the approximate construction cost is calculated by performing the same calculation as the simulation sytem (S507). At this time, the items of the environmental yardstick are not independently carried out, but by complexing the "terms of contract" and "designer". As a result, it would be possible to cope with such a case in which basement floor and construction site are desired to be estimated in the same grade of importance, such that approximate construction cost of a variety of properties could be calculated.

Second Embodiment

According to the first embodiment, the simulation has been performed by multiplying the area yardstick data by the ratio obtained by dividing the environmental yardstick data by the total weighed average data, but it could be performed also by multiplying "basic factor distribution" obtained by dividing the area yardstick data by the total weighed average value by environmental factor data.

For an example similar to the first embodiment, according to the second embodiment, the basic factor distribution of the area yardstick and the basement yardstick data of the environmental yardstick data are multiplied for calculating the approximate construction unit price, which is further multiplied by the total floor area to provide the expected construction cost. Further, in the same manner, the basic factor distribution data of the area yardstick and the yardstick data of the construction site are multiplied, the result of which is then further multiplied by the input total floor area to provide the expected construction cost. In this manner, the expected construction costs for all items are calculated based on the basic factor distribution data of area yardsticks and the yardstick data of environmental yardsticks, and among these construction costs one having factors of the highest necessity would be determined as the expected construction cost. In this manner, the basic factor distribution data having been calculated from the area yardstick is corrected by the environmental yardstick (characteristic value) to provide an accurate approximate construction cost.

A second embodiment according to this invention will now be described more in detail in view of the first embodiment.

Figure 25:
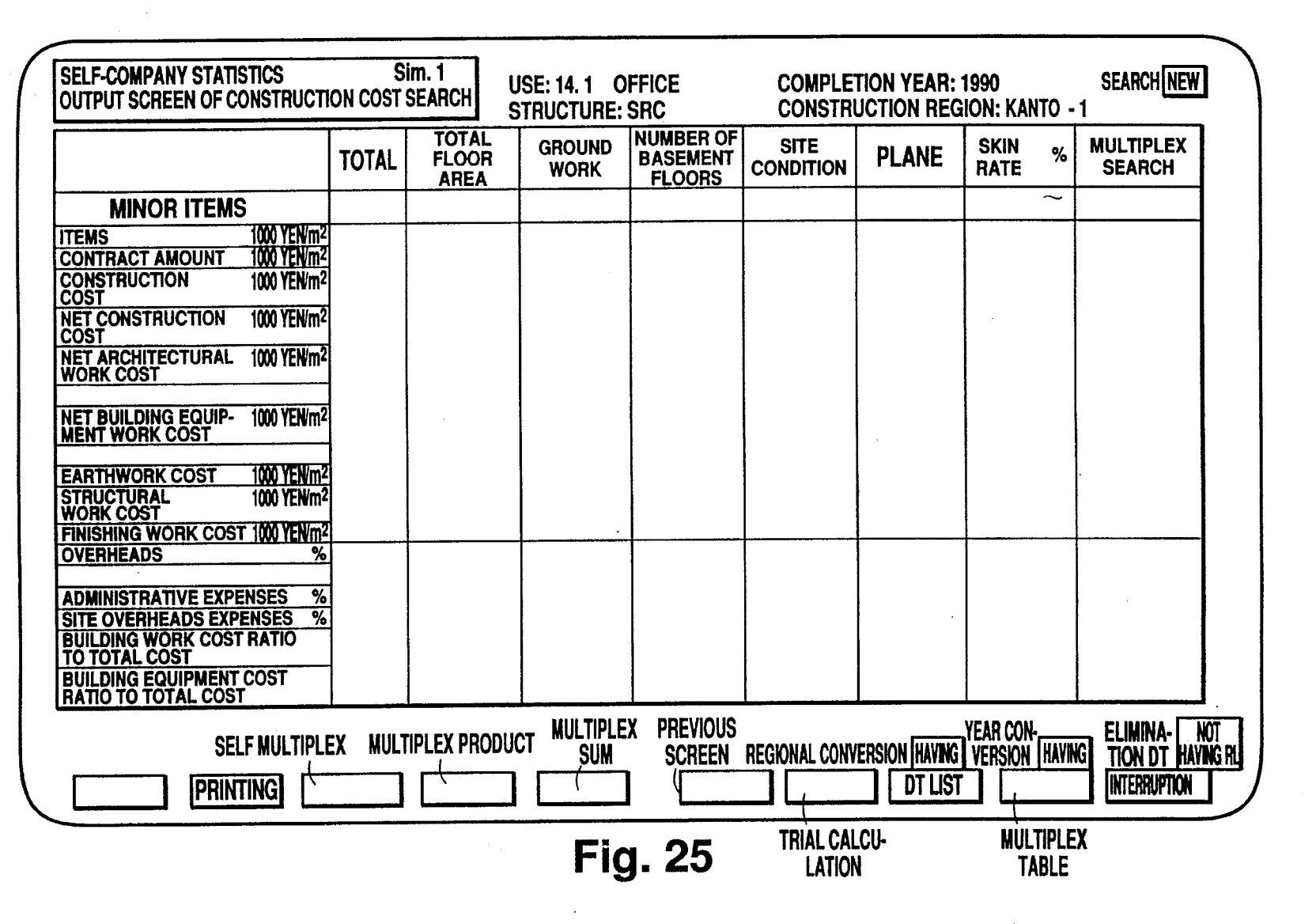

FIG. 25 is an example of yardstick output screen equivalent to that in FIG. 15. the area yardsticks and the environmental yardsticks are calculated in the same manner as in the first embodimennt, and the area and the environmental yardstick data and the total weighed average data are output for each item, as in FIG. 15. Among the function keys shown in the lower part of the screen, those of "self multiplex", "multiplex multiplication", and "multiplex sum" are used for a case in which the environmental yardsticks hereafter described are used in a complex manner.

Also in this second embodiment, a simulation is carried out by transferring the yardstick data to the simulation screen. FIG. 26 shows a simulation screen equivalent to FIG. 17 of the first embodiment. In the first embodiment, approximate construction unit price is calculated by multiplying the area yardstick data by the basement floor yardstick data ratio of the environmental yardstick, the result of which is then multiplied by the input total floor area for providing the assumed construction cost. Further, in the same manner, the area yardstick data are multiplied by the yardstick data ratio of construction site of the environmental yardstick, the result of which is further multiplied by the input total floor area for providing the expected construction cost. Among the calculated expected construction cost, one having factors of high necessity would be determined as the final approximate construction cost. In the displayed screen, in FIG. 17, with regard to the item of net building construction cost of number of subbasement floor, for example, the ratio having been obtained by dividing the yardstick data of number of subbasement floor by the total weighed average data, and in the case of correcting this ratio its corrected ratio, are input at this stage. On the other hand, in this second embodiment, a ratio obtained by dividing the area yardstick data by the total weighed average data (the item "corrected value" in FIG. 26), i.e. the basic factor distribution of the construction is output to the item of net architectural work cost of the area yardstick, and yardstick data of number of basement floors and a value obtained by multiplying this yardstick data by the basic factor distribution of construction (ratio of the area yardstick), i.e. the corrected money amount is output to the item of number of basement floors. Also, in the case of the net building equipment work cost, in FIG. 17, the area yardstick data are output to the item of the area yardstick and the ratio obtained by dividing the yardstick data by the total weighed average data is output to the item of number of basement floors, while in FIG. 26, a ratio obtained by dividing the area yardstick data by the total weighed average data (basic factor distribution of the building equipment) is output to the item of area yardstick, and the yardstick data and a value obtained by multiplying the yardstick data by the basic factor distribution of the building equipment (ratio of the area yardstick) is output to the item of number of basement floors. The same is true for the overheads (ratio).

In this manner, according to the second embodiment, the area yardstick and the environmental yardstick are used in the same manner as in the first embodiment, but the differences are that the basic factor distribution data calculated from the area yardstick i.e. the ratio of the area yardstick data of the building equipment work cost and the overheads (ratio) are multiplied by the environmental yardstick of the building, building equipment and overheads (ratio) as characteristics value so as to enable accurate approximate construction cost. Thus obtained approximate construction cost is as accurate as that in the first embodiment, and the reliability of the obtained approximate construction cost will be improved since the estimation process is quite close to the trial calculation process to be performed practically.

Figure 27:
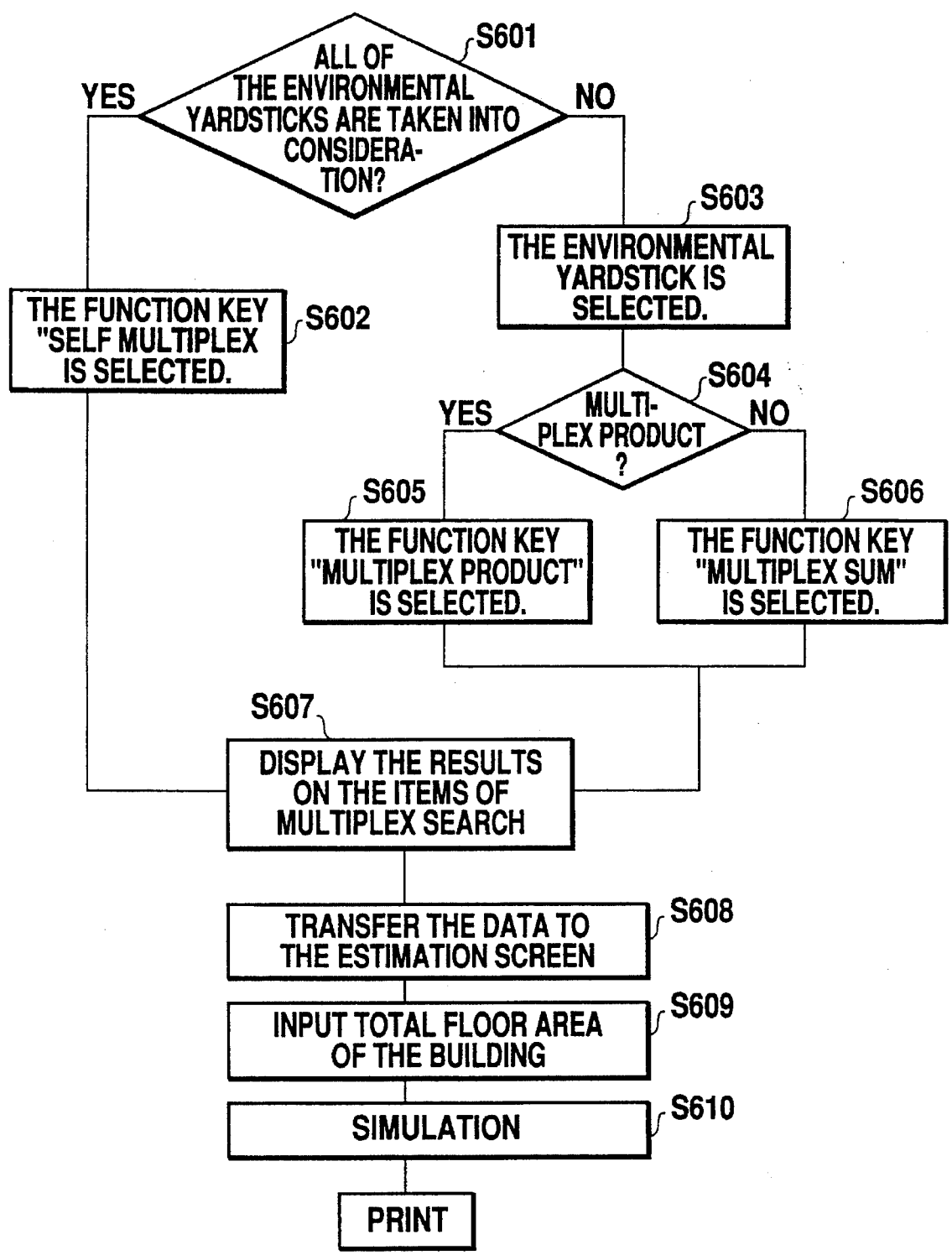
FIG. 27 is a flow diagram of simulation system according to the second embodiment of this invention.

Further, according to the second embodiment, it is also possible to calculate the approximate construction cost by correcting the basic factor distribution data by the environmental yardstick using the environmental yardstick in complex manner. FIG. 27 is a flow diagram when environmental yardsticks equivalent to FIG. 19 of the first embodiment are used in a complex manner. First, it is judged whether all of the environmental yardsticks are taken into consideration (S601). This judgment is made depending on whether the function key "self multiplex" is selected or not. If the function key "self multiplex" is selected (S602), the characteristics value (weighed average value) is automatically calculated for each data group which would satisfy a part or all of the environmental yardsticks shown in FIG. 25 (in this embodiment, ground work, number of basement floors, site condition, plane, exterior wall ratio), and the maximum values thereof will be displayed on the item of multiplex search (S607).

Meanwhile, for obtaining a characteristics value which would meet just a specific environmental yardstick, the environmental yardstick is first selected (S603). The selected yardstick is then surrounded by color frame on the screen. If a multiplex product is required, the function key "multiplex product" is selected (S605), while if a multiplex sum is required, the function key "multiplex sum" is selected (S606), so that the results thereof would be displayed on the item of multiplex search (S607).

Figure 28A:
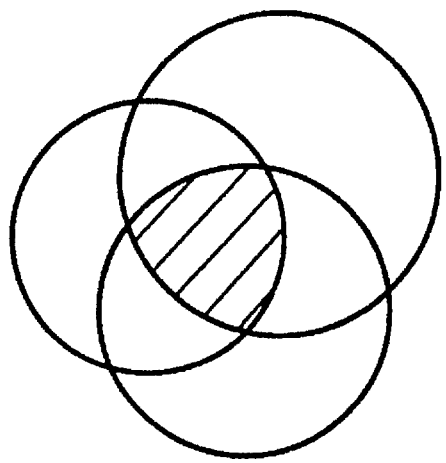
FIG. 28A is a conceptional view of multiplex product according to the second embodiment of this invention.
Figure 28B:
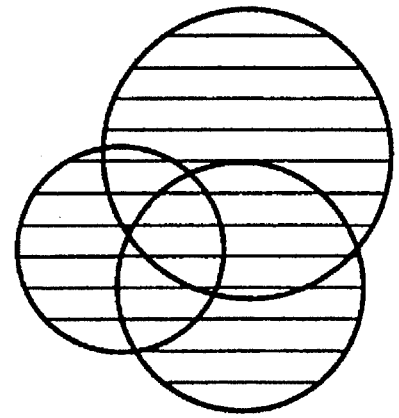
FIG. 28B is a conceptional view of multiplex sum according to the second embodiment of this invention.

These selections are made by the operator. In this case, the term multiplex product signifies a calculation for extracting just values which meet all of the yardsticks, while the term multiplex sum signifies a calculation for extracting values which meet at least one of the yardsticks. FIG. 28A and 28B shows a drawing showing a concept of multiplex product and multiplex sum in the case of three yardsticks, and the inclined lines indicate the factors to be extracted. Thus, the characteristics values of the complex environmental yardsticks are decided, and thereafter the approximate construction cost will be calculated in the same manner as the process S505–S507 in FIG. 19, by transferring the data to the estimation screen (S608), inputting total floor area of the building subject to the estimation (S609), and performing the simulation (S610).

As mentioned above, according to the data estimating system of the present invention, the data to be determined from a plurality of factors are statistically processed so that data values equivalent to desired factors could be estimated readily and accurately.

Further, according to this invention, an approximate construction cost of a desired building can be accurately estimated by easy operation so as to provide quite effective information for planning of building etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data estimating system for estimating a data value corresponding to a desired factor by statistically processing data, the values of which are determined by environmental factors and basic factors, said system comprising:

memory means for storing said data;

classifying means for classifying said data stored in said memory means into classes by discriminating the basic factors and the environmental factors and further classifying the basic factors and the environmental factors into a predetermined grades;

average value calculating means for calculating a weighed average value of data in each class of the basic factors, a weighed average value of data in each class of the environmental factors, and a weighed average value of a total data that includes data in the environmental and basic factors;

input means for inputting a desired basic factor and a desired environmental factor; and calculating means for estimating the data value corresponding to the desired basic and environmental factors based on a ratio of a weighed average value of a specific class corresponding to the input desired basic factor and a weighed average value of a specific class corresponding to the input desired environmental factor to the weighed average value of the total data.

2. A data estimating system for estimating a construction cost of a desired building having desired factors including a desired total floor area by statistically processing building construction cost data, said system comprising:

memory means for storing the building construction cost data;

classifying means for classifying building construction cost data stored in said memory means into specific classes and grades of classes according to total floor area and other factors;

input means for inputting desired factors of a desired building including desired total floor area; and calculating means for estimating the construction cost of the desired building having the desired factors on the basis of a ratio of a weighed average value of the square-meter costs for a building of a specific class that is substantially equivalent to the desired building having the desired input total floor area and a weighed average value of square-meter costs for a building of a specific class that is substantially equivalent to the desired building having factors other than the desired input total floor area to a weighed average value of square-meter costs for a building having all of the aforementioned factors.

3. A data estimating system for estimating a construction cost of a desired building having desired factors including a desired total floor area by statistically processing building construction cost data of a plurality of buildings determined from factors including the total floor area, said system comprising:

memory means for storing building construction cost data of the plurality of buildings;

classifying means for classifying the building construction cost data stored in said memory means by classifying according to total floor area of each building and by classifying according to other factors using predetermined grades;

first input means for inputting desired factors including a desired total floor area;

second input means for inputting factors, other than the desired total floor area, to be complexed among the desired factors; and calculating means for estimating the construction cost of the desired building having desired factors including the desired total floor area on the basis of a ratio of weighed average value of square-meter costs for a building of a specific class equivalent to the input desired total floor area and a weighed average value of square-meter costs for a building of a specific class equivalent to complexed factors other than the input total floor area, to a weighed average value of square-meter costs for all of the plurality of buildings.

4. A data estimating system for estimating a data value corresponding to desired factors by statistically processing a plurality of data having values determined from a plurality of factors, said system comprising:

memory means for storing a plurality of data;

classifying means for classifying said data stored in said memory means into each class by discriminating said plurality of factors as basic factors and environmental factors, and further said data using predetermined grades;

weighed average value calculating means for calculating a weighed average value of data of the basic factors in each class, a weighed average value of data of the environmental factors in each class, and a weighed average value of all of said data;

input means for inputting desired basic factors and desired environmental factors; and calculating means for estimating the data value corresponding to desired factors on the basis of a ratio of a weighed average value of a specific class equivalent to the desired environmental factor and a weighed average value of a specific class equivalent to the desired basic factor to a weighed average value of all of said data.

5. A data estimating system for estimating a construction cost of a desired building having desired factors including a desired total floor area by statistically processing construction costs of a plurality of buildings determined from factors including total floor area, said system comprising:

memory means for storing construction cost data of the plurality of buildings;

classifying means for classifying the building construction cost data stored in said memory means by classifying according to total floor area and other factors and further classifying according to predetermined grades;

input means for inputting desired factors including a desired total floor area; and calculating means for estimating the construction cost of the desired building on the basis of a ratio of a weighed average value of square-meter costs for the buildings of a specific class equivalent to factors other than the input total floor area and a weighed average value of square-meter costs for the buildings of a specific class equivalent to the input desired total floor area to a weighed average value of square-meter costs for all buildings.

6. A data estimating system for estimating a construction cost of a desired building having desired factors including a desired total floor area by statistically processing building construction cost data of a plurality of buildings determined from factors including the total floor area, said system comprising:

memory means for storing building construction cost data of the plurality of buildings;

classifying means for classifying the building construction cost data stored in said memory means by classifying according to total floor area and other data and further classifying according to predetermined grades;

first input means for inputting desired factors including the desired total floor area;

second input means for inputting factors to be complexed among the desired factors other than the desired total floor area; and calculating means for estimating the construction cost of the desired building on the basis of a ratio of a weighed average value of square-meter costs for buildings of a specific class equivalent to complex factors other than the input total floor area and a weighed average value of square-meter costs for buildings of a specific class equivalent to a input desired total floor area to a weighed average value of square-meter costs for all buildings.

7. A computerized system for estimating a construction cost of a desired building from a construction cost database mother group containing construction costs for a variety of buildings, comprising:

a basic yardstick classifying means for classifying the mother group into distinct basic classes according to the basic yardstick and further classifying each distinct basic class into predetermined grades;

an environmental yardstick classifying means for classifying the mother group into distinct environmental classes according to an environmental yardstick and further classifying each distinct environmental class into predetermined grades;

a weighed average calculating means for calculating a weighed average of construction cost per unit area of data contained in each of the classes and grades of the mother group classified by the basic yardstick classifying means and the environmental classifying means;

input means for inputting a basic yardstick datum for the desired building and an environmental yardstick datum for the desired building;

construction cost estimating means for estimating the construction cost of the desired building based on the weighed average of construction cost per unit area of the data contained in each of the classes and grades and the basic yardstick datum for the desired building; and cost estimation refining means for refining the construction cost estimate based on the environmental yardstick datum for the desired building.

8. The computerized system of claim 7, further comprising:

mother group searching means for searching a construction cost database mother group according to desired properties to extract a small mother group having the desired properties;

wherein said basic yardstick classifying means and said environmental yardstick classifying means classify the small mother group extracted by the mother group searching means.

9. The computerized system of claim 7, further comprising:

complex environmental yardstick input means for inputting a plurality of environmental yardsticks;

complex environmental yardstick formation means for forming a complex environmental yardstick that includes a combination of distinct environmental classes and predetermined grades from each of the plurality of environmental yardsticks input by said complex yardstick input means;

wherein said environmental yardstick classifying means classifies the mother group into distinct environmental classes according to the complex environmental yardstick and further classifies each distinct environmental class into predetermined grades.

10. The computerized system of claim 7, wherein the environmental yardstick includes conceptual and numerical environmental yardstick data.

11. A computer implemented method for estimating a construction cost of a desired building from a construction cost database mother group containing construction costs for a variety of buildings, comprising the steps of:

a basic yardstick classifying step for classifying the mother group into distinct basic classes according to the basic yardstick and further classifying each distinct basic class into predetermined grades;

an environmental yardstick classifying step for classifying the mother group into distinct environmental classes according to an environmental yardstick and further classifying each distinct environmental class into predetermined grades;

a weighed average calculating step for calculating a weighed average of construction cost per unit area of data contained in each of the classes and grades of the mother group classified by the basic yardstick classifying step and the environmental classifying step;

inputting a basic yardstick datum for the desired building and an environmental yardstick datum for the desired building;

estimating the construction cost of the desired building based on the weighed average of construction cost per unit area of the data contained in each of the classes and grades and the basic yardstick datum for the desired building; and refining the construction cost estimate based on the environmental yardstick datum for the desired building.

12. The computer implemented method of claim 11, further comprising the step of:

a mother group searching step for searching a construction cost database mother group according to desired properties to extract a small mother group having the desired properties;

wherein said basic yardstick classifying step and said environmental yarstick classifying step classify the small mother group extracted by the mother group searching step.

13. The computer implemented method of claim 11, further comprising the steps of:

a complex environmental yardstick input step for inputting a plurality of environmental yardsticks;

a complex environmental yardstick formation step for forming a complex environmental yardstick that includes a combination of distinct environmental classes and predetermined grades from each of the plurality of environmental yardsticks input by said complex yardstick input step;

wherein said environmental yardstick classifying step classifies the mother group into distinct environmental classes according to the complex environmental yardstick and further classifies each distinct environmental class into predetermined grades.

14. The computer implemented method of claim 11, wherein the environmental yardstick includes conceptual and numerical environmental yardstick data.

* * * * *